United States Patent [19]
Garg et al.

[11] Patent Number: 5,284,526
[45] Date of Patent: Feb. 8, 1994

[54] INTEGRATED PROCESS FOR PRODUCING ATMOSPHERES SUITABLE FOR HEAT TREATING FROM NON-CRYOGENICALLY GENERATED NITROGEN

[75] Inventors: Diwakar Garg, Macungie; Brian B. Bonner, Nesquehoning; Donald P. Eichelberger, Macungie, all of Pa.

[73] Assignee: Air Products and Chemicals, Inc., Allentown, Pa.

[21] Appl. No.: 995,625

[22] Filed: Dec. 22, 1992

[51] Int. Cl.$^5$ .................... C21D 11/00; F27D 23/00
[52] U.S. Cl. .................... 148/208; 148/216; 148/218
[58] Field of Search .................... 148/208, 216, 218

[56] References Cited

U.S. PATENT DOCUMENTS

| | | | |
|---|---|---|---|
| 3,535,074 | 10/1970 | Nakashima | 23/2 |
| 4,859,434 | 8/1989 | Roberts et al. | 423/219 |
| 4,931,070 | 6/1990 | Prasad | 55/16 |
| 5,057,164 | 10/1991 | Nilsson et al. | 148/16 |
| 5,064,620 | 11/1991 | Beuret | 266/81 |
| 5,069,728 | 12/1991 | Rancon et al. | 266/81 |
| 5,160,380 | 11/1992 | Vocke et al. | 148/206 |

FOREIGN PATENT DOCUMENTS

| | | |
|---|---|---|
| 4556189 | 11/1989 | Australia . |
| 4556289 | 11/1989 | Australia . |
| 0404496 | 6/1990 | European Pat. Off. . |
| 2639249 | 5/1990 | France . |
| 2639251 | 5/1990 | France . |

OTHER PUBLICATIONS

P. Murzyn & L. Floreo, Jr., Carburizing with Membrane N$_2$; procem and Quality issues, Mar. 1988, pp. 28-32.

H. Walton; New Method of Generating Nitrogen for Controlled Atmosphere Heat Treatment at Torrington Shiloh Plant Mar. 1986, pp. 40-46.

P. F. Stratton, The Use of Non-Cryogenically Produced Nitrogen in Furnace Atmospheres, 1989, pp. 63-67.

D. J. Bowe & D. L. Fung, How PSA nitrogen works in a heat treating shop, pp. 30-33.

Primary Examiner—Upendra Roy
Attorney, Agent, or Firm—James C. Simmons; William F. Marsh

[57] ABSTRACT

An integrated two-step process for producing low-cost atmospheres suitable for annealing ferrous and non-ferrous metals and alloys, brazing metals, sealing glass to metals, and sintering metal and ceramic powders in continuous furnaces from non-cryogenically produced nitrogen containing up to 3% residual oxygen is disclosed. The residual oxygen present in non-cryogenically produced nitrogen is converted to moisture by mixing it hydrogen and passing the mixture through a reactor packed with a platinum group catalyst in the first step of the process. The reactor effluent stream containing a mixture of nitrogen, unreacted hydrogen, and moisture is mixed with a predetermined amount of a hydrocarbon gas and introduced into the heating zone of a continuous furnace in the second step of the process to 1) convert moisture to a mixture of carbon monoxide and hydrogen by reaction with the hydrocarbon gas via water gas shift reaction and 2) produce atmospheres in-situ suitable for heat treating. The key features of the process include 1) use of economical amount of hydrogen to convert residual oxygen to moisture in an external catalytic reactor and 2) conversion of moisture to a mixture of carbon monoxide and hydrogen by reaction with the hydrocarbon gas via water gas shift reaction in the hot zone of a continuous furnace. The disclosed process is particularly suitable for producing low-cost heat treating atmospheres for continuous furnaces operated at 700° C. and above.

12 Claims, 3 Drawing Sheets

INTEGRATED PROCESS FOR PRODUCING ATMOSPHERES SUITABLE FOR HEAT TREATING FROM NON-CRYOGENICALLY GENERATED NITROGEN

FIELD OF THE INVENTION

The present invention pertains to production of controlled atmosphere for heat treating furnaces.

BACKGROUND OF THE INVENTION

Nitrogen-based atmospheres have been routinely used by the heat treating industry both in batch and continuous furnaces since the mid-nineteen seventies. Because of low dew point and virtual absence of carbon dioxide, nitrogen-based atmospheres do not exhibit oxidizing and decarburizing properties and are therefore suitable for a variety of heat treating operations. More specifically, a mixture of nitrogen and hydrogen has been extensively used for bright annealing low to high carbon steels and non-ferrous metals and alloys such as copper and gold. A mixture of nitrogen and a hydrocarbon such as methane or propane has gained wide acceptance for neutral hardening and decarburization-free annealing of medium to high carbon steels. A mixture of nitrogen and methanol has been developed and used for carburizing low to medium carbon steels. Finally, a mixture of nitrogen, hydrogen, and moisture has been used for brazing metals and sealing glass to metals.

A major portion of nitrogen used by the heat treating industry has been produced by distillation of air in large cryogenic plants. The cryogenically produced nitrogen is generally very pure and expensive. To reduce the cost of nitrogen, several non-cryogenic air separation techniques such as adsorption and permeation have been recently developed and introduced in the market. Nitrogen produced using non-cryogenic processes is much less expensive but it contains 0.05 to 5% residual oxygen, making a direct substitution of cryogenically produced nitrogen with non-cryogenically produced nitrogen in continuous heat treating furnaces very difficult. Non-cryogenically produced nitrogen has, however, been successfully used to replace cryogenically produced nitrogen in applications where surface oxidation can be tolerated. For example, non-cryogenically produce nitrogen has been successfully used in oxide annealing of carbon steel parts which are generally machined after heat treatment.

Non-cryogenically produced nitrogen has also been successfully used to replace cryogenically produced nitrogen in applications where surface finish or appearance is not important. For example, a mixture of non-cryogenically produced nitrogen and methanol is commercially used for carburizing steels in batch furnaces as well as continuous furnaces equipped with integrated quench cooling zones. Carburizing processes using non-cryogenically produced nitrogen/methanol mixtures have been described in detail in papers titled, "Carburizing with Membrane $N_2$: Process and Quality Issues", published in Heat Treating, pages 28-32, March 1988, "New Method of Generating Nitrogen for Controlled Atmosphere Heat Treatment at Torrington Shiloh Plant", published in Industrial Heating, pages 40-46, March 1986, and "The Use of Non-Cryogenically Produced Nitrogen in Furnace Atmospheres", published in Heat Treatment of Metals, pages 63-67, March 1989. The use of non-cryogenically produced nitrogen/methanol mixtures have, however, not been successful for bright annealing or heat treating parts without surface oxidation in continuous furnaces. Additionally, such atmospheres have not been successful for heat treating parts in continuous furnaces operated at temperatures below about 900° C. and are not cost-effective because they require an expensive methanol delivery system.

Attempts have been made to use other reducing gases such as a hydrocarbons and hydrogen along with non-cryogenically produced nitrogen to produce atmospheres suitable for heat treating or bright annealing parts in continuous furnaces but with limited success even with the use of an excess amount of a reducing gas. The problem has generally been related to surface oxidation of the heat treated or annealed parts in the cooling and/or heating zones of the furnace. For example, methane has been added into the heating zone of continuous furnaces with non-cryogenically produced nitrogen in an attempt to generate atmospheres suitable for oxidation- and decarburization-free annealing or hardening of carbon steels. It was, however, not successful due to excessive oxidation and decarburization of the parts, as described in a paper titled, "The Use of Non-Cryogenically Produced Nitrogen in Furnace Atmospheres", published in Heat Treatment of Metals, pages 63-67, March 1989. The oxidation and decarburization problems were related to the slow rate of reaction between oxygen and methane at low temperatures and/or short residence times in continuous furnaces used for oxide- and decarburization-free annealing. The above paper concluded that non-cryogenically produced nitrogen would be cost competitive to cryogenically produced nitrogen if residual oxygen levels below about 0.2% would be achieved. Attempts have also been made to use hydrogen gas as a reducing agent with non-cryogenically produced nitrogen for oxide-free and bright annealing of carbon steels in continuous furnaces. Unfortunately, the process required excessive amounts of hydrogen, making the use of non-cryogenically produced nitrogen economically unattractive as pointed out in the last mentioned paper.

A mixture of non-cryogenically produced nitrogen and hydrogen has been used for annealing copper and described in papers titled, "The Use of Non-Cryogenically Produced Nitrogen in Furnace Atmospheres", published in Heat Treatment of Metals, pages 63-67, March 1989 and "A Cost Effective Nitrogen-Based Atmosphere for Copper Annealing", published in Heat Treatment of Metals, pages 93-97, April 1990. These papers describe that heat treated copper product was slightly discolored when all the gaseous feed containing a mixture of hydrogen and non-cryogenically produced nitrogen with residual oxygen was introduced into the hot zone of a continuous furnace. It is, therefore, clearly evident that one would conclude copper cannot be bright annealed with a mixture of non-cryogenically produced nitrogen and hydrogen in continuous furnaces.

U.S. Pat. No. 5,057,164 claims producing atmosphere suitable for heat treating metals from non-cryogenically produced nitrogen in continuous furnaces by reacting residual oxygen with hydrogen or carbon monoxide in the heating zone followed by abstracting a apart of the atmosphere from the heating zone and introducing it into the cooling zone of the furnace. Unfortunately, this process requires large amounts of hydrogen or carbon monoxide to provide high $pH_2/pH_2O$ or $pCO/pCO_2$ ratio (or reducing environment) in the furnace, making it uneconomical for bright annealing steels, brazing steels, and sintering steel powders in continuous furnaces.

Researchers have explored numerous alternative ways of using non-cryogenically produced nitrogen for heat treating metals in continuous furnaces. For example, furnace atmospheres suitable for bright annealing copper, brazing copper, decarburized annealing steel, and sintering copper and copper alloys have been claimed to be generated from non-cryogenically produced nitrogen by converting residual oxygen to moisture with hydrogen gas in external units prior to feeding atmospheres into the furnaces. Such atmosphere generation methods have been disclosed in detail in U.S. Pat. No. 3,535,074, Australian Patent Application numbers AU45561/89 and AU45562/89 dated 24 November 1988, and European Patent Application number 90306645.4 dated 19 June 1990. Unfortunately, these processes are not cost-effective for bright annealing steels, brazing steels, and sintering steel powders because they require large amounts of hydrogen to maintain high $pH_2/pH_2O$ ratio (or reducing environment) in the furnace. Additionally, these processes are limited in scope because they result in excessive decarburization of steel parts.

U.S. Pat. No. 4,931,070 and French patent publications 2,639,249 and 2,639,251 dated 24 November 1988 claim producing atmospheres suitable for heat treating metals from non-cryogenically produced nitrogen by converting residual oxygen to moisture with hydrogen in external catalytic units followed by extraction of moisture prior to introducing atmospheres into furnaces. These methods are not cost effective because of the substantial costs involved in extracting moisture from atmospheres.

U.S. Pat. No. 5,069,728 claims producing atmospheres suitable for heat treating from non-cryogenically produced nitrogen by simultaneously introducing 1) non-cryogenically produced nitrogen along with hydrogen and carbon monoxide in the heating zone and 2) non-cryogenically produced nitrogen pretreated to convert the residual oxygen to moisture with hydrogen in an external catalytic reactor or nitrogen gas free of oxygen in the cooling zone of a continuous furnace. Unfortunately, this method requires large amounts of hydrogen or carbon monoxide to maintain high $pH_2/pH_2O$ or $pCO/pCO_2$ ratio (or reducing environment) in the furnace, making it uneconomical for bright annealing steels, brazing steels, and sintering steel powders in continuous furnaces.

U.S. Pat. No. 4,859,434 claims producing atmospheres suitable for heat treating from non-cryogenically produced nitrogen by reacting residual oxygen with vaporized methanol in an external catalytic reactor. This method has not been used in many parts of the world because of the costs involved in installing a methanol delivery system.

Based upon the above discussion, it is clear that there is a need to develop a process for generating low-cost atmospheres for bright annealing ferrous and non-ferrous metals and alloys, brazing steels, sealing glass to metals, and sintering metal and ceramic powders in continuous furnaces from non-cryogenically produced nitrogen. Additionally, there is a need to develop a process which 1) is cost effective, 2) eliminates need of an expensive delivery system for the reducing agent, 3) reduces hydrogen requirement, and 4) minimizes decarburization of steels during heat treatment.

SUMMARY OF THE INVENTION

The present invention is an integrated two-step process for producing low-cost atmospheres from non-cryogenically produced nitrogen suitable for bright annealing or heat treating ferrous and non-ferrous metals and alloys, brazing metals, sintering metal and ceramic powders, and sealing glass to metals in continuous furnaces with separate heating and cooling zones. According to the process, suitable atmospheres are produced by 1) mixing non-cryogenically produced nitrogen containing up to 3% residual oxygen with hydrogen and passing the mixture through a reactor packed with a platinum group catalyst to convert residual oxygen present in the non-cryogenically produced nitrogen to moisture and 2) mixing the reactor effluent stream containing a mixture of nitrogen, unreacted hydrogen, and moisture with a predetermined amount of a hydrocarbon gas and introducing the mixture into the heating zone of a continuous furnace to convert moisture in-situ to a mixture of carbon monoxide and hydrogen by reaction with the hydrocarbon gas via water gas shift reaction and produce atmospheres suitable for heat treating metals.

According to the invention, low and high carbon steels are bright, oxide-free annealed in a continuous furnace operated at 700° C. and above by 1) flowing a mixture of non-cryogenically produced nitrogen and hydrogen through a catalytic reactor to convert residual oxygen to moisture and 2) introducing the reactor effluent stream containing a mixture of nitrogen, unreacted hydrogen, and moisture mixed with a hydrocarbon gas into the heating zone of a furnace to convert moisture in-situ to a mixture of carbon monoxide and hydrogen by reaction with the hydrocarbon gas via water gas shift reaction. The flow rate of hydrogen is controlled in a way that it is slightly greater than the stoichiometric amount required for complete conversion of residual oxygen to moisture. More specifically, the flow rate of hydrogen is controlled to be at least 1.05 times the stoichiometric amount required for complete conversion of residual oxygen to moisture. The flow rate of a hydrocarbon gas is controlled in a way that it yields a reducing environment or the desired $pH_2/pH_2$) ratio in the furnace.

The atmospheres suitable for brazing steels, sintering metal and ceramic powders, sealing glass to metals, and annealing non-ferrous alloys are produced in a continuous furnace operated at 700° C. and above by 1) flowing a mixture of non-cryogenically produced nitrogen and hydrogen through a catalytic reactor to convert residual oxygen to moisture and 2) introducing the reactor effluent stream containing a mixture of nitrogen, unreacted hydrogen, and moisture mixed with a hydrocarbon gas into the heating zone of a furnace to convert moisture in-situ to a mixture of carbon monoxide and hydrogen by reaction with the hydrocarbon gas via water gas shift reaction. The flow rate of hydrogen is once again controlled in a way that it is always slightly greater than the stoichiometric amount required for complete conversion of residual oxygen to moisture. More specifically, the flow rate of hydrogen is controlled to be at least 1.05 times the stoichiometric amount required for complete conversion of residual oxygen to moisture. The flow rate of a hydrocarbon gas is controlled in a way that it yields a reducing environment or the desired $pH_2/pH_2O$ ratio in the furnace.

DETAILED DESCRIPTION OF THE INVENTION

Figure 1:
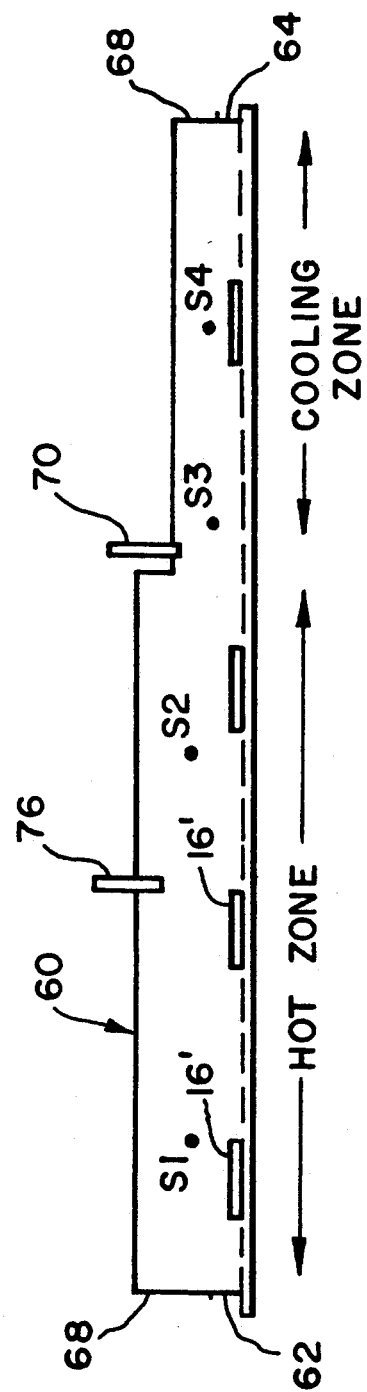
FIG. 1 is a schematic representation of a furnace used to test the heat treating process according to the present invention.

The process of the present invention is based on the surprising discovery that atmospheres suitable for heat treating or bright annealing ferrous and non-ferrous metals and alloys, brazing metals, powder metal sintering, and sealing glass to metals can be produced by 1) mixing non-cryogenically produced nitrogen containing up to 3% residual oxygen with hydrogen and passing the mixture through a reactor packed with a platinum group catalyst to convert residual oxygen present in the non-cryogenically produced nitrogen to moisture and 2) mixing the reactor effluent stream containing a mixture of nitrogen, unreacted hydrogen, and moisture with a predetermined amount of a hydrocarbon gas and introducing it into the heating zone of a continuous furnace to convert moisture in-situ to a mixture of carbon monoxide and hydrogen by reaction with the hydrocarbon gas via water gas shift reaction.

Nitrogen gas produced by cryogenic distillation of air has been widely employed in many heat treating applications. Cryogenically produced nitrogen is substantially free of oxygen (oxygen content has generally been less than 10 ppm) and expensive. Therefore, there has been a great demand, especially by the heat treating industry, to generate nitrogen inexpensively for heat treating applications. With the advent of non-cryogenic technologies for air separation such as adsorption and permeation, it is now possible to produce nitrogen gas inexpensively. The non-cryogenically produced nitrogen, however, is contaminated with up to 5% residual oxygen, which is generally undesirable for many heat treating applications. The presence of residual oxygen has made the direct substitution of cryogenically produced nitrogen with that produced by non-cryogenic techniques very difficult.

Several attempts have been made to substitute cryogenically produced nitrogen with that produced non-cryogenically in continuous furnaces, but with limited success even with the addition of excess amounts of a reducing gas. The metallic parts treated with non-cryogenically produced nitrogen were always scaled, rusted, or heavily oxidized. These problems have been believed to be caused by the presence of unconverted oxygen in the furnace.

According to the present invention scaling, rusting, and oxidation problems are surprisingly resolved by generating a furnace atmosphere using the steps of 1) converting residual oxygen present in non-cryogenically produced nitrogen with hydrogen to moisture in an external catalytic reactor and 2) feeding the reactor effluent stream containing a mixture of nitrogen, unreacted hydrogen, and moisture along with a hydrocarbon gas in a controlled manner into the heating zone of a continuous furnace to convert moisture in-situ to a mixture of carbon monoxide and hydrogen by reaction. The function of the external reactor is to convert most of the residual oxygen present in non-cryogenically produced nitrogen with hydrogen to moisture and to produce an effluent stream with less than 10 ppm oxygen. The function of hydrocarbon gas added to the gaseous mixture introduced into the heating zone of the furnace is to react with moisture in the presence of furnace heat and produce a mixture of carbon monoxide and hydrogen both of which are desirable for heat treating metals.

The residual oxygen in non-cryogenically produced nitrogen for the process of the present invention can vary from 0.7% to about 3%, preferably from about 0.1% to about 2%, and ideally from about 0.2% to about 1.0%.

The amount of hydrogen required for converting residual oxygen to moisture in an external catalytic reactor can be 1.05 times the stoichiometric amount or more. It can be supplied in the gaseous form from high pressure hydrogen gas source or by vaporizing liquid hydrogen. It can also be produced by dissociating ammonia in an ammonia dissociator.

The external catalytic reactor is packed with a precious metal catalyst supported on a high surface area support material made of alumina, magnesia, zirconia, silica, titania, or mixtures thereof. The precious metal catalyst can be selected from platinum group metals such as platinum, palladium, rhodium, ruthenium, or mixtures thereof. The metal concentration in the catalyst can vary from about 0.05 to about 1.0 wt %. Preferably, the catalyst is approximately 0.5 wt % palladium in the metal form supported on a high surface area alumina. The catalyst can be shaped in the form of pellets or balls.

The precious metal catalyst can, with the metal concentration set forth above, optionally be supported on a metallic or a ceramic honeycomb structure to avoid problems related to pressure drop through the reactor. Metal catalyst supported on metallic or ceramic honeycomb is ideal for low pressure hydrogen generated by dissociating ammonia in an ammonia dissociator.

The hourly flow rate of gaseous mixture flowing through the catalytic reactor can vary from about 1,000 to 50,000 times the volume of the reactor. It can preferably vary from about 4,000 to 20,000 times the volume of the reactor. The catalytic reactor requires no external heating if the gaseous feed mixture is supplied at a temperature of 50° F. or above. This is because the reaction between hydrogen and oxygen over the above described catalysts is self-initiating in nature. The catalytic reactor will heat up automatically because of the exothermic nature of the reaction. The final temperature of the reactor will depend upon the concentration of the residual oxygen in the feed stream. However, it may be necessary to heat the reactor initially to start the reaction if the feed gas temperature is supplied at a temperature below about 50° F. The external heating of the reactor may preferably be turned off once the reaction has been initiated.

The effluent stream from the catalytic reactor containing a mixture of nitrogen, moisture, unreacted hydrogen and less than 10 ppm residual oxygen is mixed with 0.2% to 5.0% hydrocarbon gas prior to feeding the mixture into the heating zone of a continuous furnace. The hydrocarbon gas can optionally be mixed with the non-cryogenically produced nitrogen and hydrogen mixture and passed through the catalytic reactor. The hydrocarbon gas can be selected from alkanes such as methane, ethane, propane, and butane and alkenes such as ethylene, propylene, and butene. Commercial feedstocks such as natural gas, petroleum gas, cooking gas, coke oven gas, and town gas can also be used as a hydrocarbon gas.

The effluent gas stream from the catalytic reactor premixed with a hydrocarbon gas can be introduced into the heating zone of a continuous furnace through an open tube. The internal diameter of the open tube can vary from 0.25 in. to 5 in. The open tube can be inserted in the heating zone of the furnace through the top, sides, or the bottom of the furnace depending upon the size and the design of the furnace. It can be inserted through the cooling zone vestibule connected via a long tube. It can also be placed through the heating zone vestibule once again connected via a long tube. It is however very important that the open tube is not placed too close to the entrance or the shock zone (transition zone) of the furnace. This is because temperatures in these areas are substantially lower than the maximum temperature in the furnace, resulting in poor reaction between moisture and the hydrocarbon gas and concomitantly undesirable (not bright) surface appearance of the parts.

The effluent gas stream from the catalytic reactor premixed with a hydrocarbon gas can preferably be introduced into the heating zone of a continuous furnace through a device that prevents the direct impingement of feed gas containing moisture on the parts and/or helps in converting a part of moisture with the hydrocarbon gas to a mixture of carbon monoxide and hydrogen prior to coming in contact with the parts. Such devices are shown in U.S. patent application Ser. No. 07/727,806, filed Jul. 8, 1991, the specification of which is incorporated herein by reference.

In addition to using devices discussed above, a flow directing plate or a device facilitating mixing of hot gases present in the furnace with the feed gas can also be used.

The design and dimensions of the device will depend upon the size of the furnace, the operating temperature, and the total flow rate of the feed used during heat treatment. For example, the internal diameter of an open tube fitted with a baffle can vary from 0.25 in. to 5 in. The porosity and the pore size of porous sintered metal or ceramic end tubes can vary from 5% to 90% and from 5 microns to 1,000 microns, respectively. The length of porous sintered metal or ceramic end tube can vary from about 0.25 in. to about 5 feet. The porous sintered metal end tube can be made of a material selected from stainless steel, Monel, Inconel, or any other high temperature resistant metal. The porous ceramic end tube can be made of alumina, zirconia, magnesia, titania, or any other thermally stable material. The diameter of metallic end tube with a plurality of holes can also vary from 0.25 in. to 5 in. depending upon the size of the furnace. The metallic end tube can be made of a material selected from stainless steel, Monel, Inconel, or any other high temperature resistant metal. Its length can vary from about 0.25 in. to about 5 feet. The size and the number of holes in this end tube can vary from 0.05 in. to 0.5 in. and from 2 to 10,000, respectively. Finally, more than one device can be used to introduce gaseous feed mixture in the hot zone of a continuous furnace depending upon the size of the furnace and the total flow rate of feed gas.

Depending upon the type of the device and the size and design of the furnace used the device can be inserted in the heating zone of the furnace through the top, sides, or the bottom of the furnace or through the cooling zone vestibule by being connected to a long tube. Such devices can also be placed through the heating zone vestibule once again connected via a long tube. It is however very important that the any atmosphere or gas injection or introduction device is not placed too close to the entrance or the shock zone (transition zone) of the furnace. This is because temperatures in these areas are substantially lower than the maximum temperature in the furnace, resulting in poor reaction between moisture and the hydrocarbon gas and concomitantly undesirable (not bright) surface appearance of the parts.

A continuous furnace with separate heating and cooling zones is most suitable for the process of the invention. It can be operated at atmospheric or above atmospheric pressure for the process of the invention. The continuous furnace can be of the mesh belt, a roller hearth, a pusher tray, a walking beam, or a rotary hearth type. The $N_2$ curtains can also be at the entry of the furnace. Non-cryogenic $N_2$ can also be used as the gas curtain. The continuous furnace can optionally be equipped with a pure nitrogen gas (containing less than 10 ppm oxygen) curtain at the entry end of the furnace and the end of the cooling zone (discharge end) to avoid infiltration of air from the outside through the discharge vestibule. Furthermore, a pure oxygen-free nitrogen stream such as the one produced by vaporizing liquid nitrogen can optionally be used in the cooling zone of the furnace.

A continuous furnace with a heating zone and an integrated quench cooling zone is also ideal for the present invention. It can be operated at atmospheric or above atmospheric pressure. The continuous furnace can be of the mesh belt, shaker, a roller hearth, a pusher tray, a shaker hearth, a rotary retort, or a rotary hearth type. A pure oxygen-free nitrogen stream such as the one produced by vaporizing liquid nitrogen can optionally be used in the quench cooling zone of the furnace to prevent infiltration of air from the outside.

The operating temperature of the continuous furnace can vary from about 700° C. to about 1,250° C. An operating temperature above about 750° C. is preferable for the process of the present invention.

Low to high carbon or alloy steels that can be heat treated according to the present invention can be selected from the groups 10XX, 11XX, 12XX, 13XX, 15XX, 40XX, 41XX, 43XX, 44XX, 47XX, 48XX, 50XX, 51XX, 61XX, 81XX, 86XX, 87XX, 88XX, 92XX, 92XX, 93XX, 50XXX, 51XXX, or 52XXX as described in Metals Handbook, Ninth Edition, Volume 4 Heat Treating, published by American Society for Metals. Tool steels selected from the groups AX, DX, HX, OX, MX, or SX, iron nickel based alloys such as Incoloy, nickel alloys such as Inconel and Hastalloy, nickel-copper alloys such as Monel, copper and copper alloys, gold alloys, and cobalt based alloys such as Haynes and Stellite can be heat treated according to process disclosed in this invention.

The iron-based powders that can be sintered according to the present invention can be selected from Fe, Fe-C with up to 1% carbon, Fe-Cu-C with up to 20% copper and 1% carbon, Fe-Ni with up to 50% Ni, Fe-Mo-Mn-Cu-Ni-C with up to 1% Mo, Mn, and carbon each and up to 2% Ni and Cu each, Fe-Cr-Mo-Co-Mn-V-W-C with varying concentrations of alloying elements depending on the final properties of the sintered product desired. Other elements such as B, Al, Si, P, S, etc. can optionally be added to the iron-based powders to obtain the desired properties in the final sintered product. These iron-based powders can be mixed with up to 2% zinc stearate to help in pressing parts from them.

Low and high carbon steels and non-ferrous metals and alloys are bright, oxide-free annealed in a continuous furnace operated at 700° C. and above by 1) flowing a mixture of non-cryogenically produced nitrogen and hydrogen through a catalytic reactor to convert residual oxygen to moisture and 2) introducing the reactor effluent stream containing nitrogen, unreacted hydrogen, and moisture mixed with a hydrocarbon gas into the heating zone of a furnace to convert moisture in-situ to a mixture of carbon monoxide and hydrogen by reaction with the hydrocarbon gas via water gas shift reaction and produce atmospheres suitable for heat treating metals. The flow rate of hydrogen is controlled in a way that it is slightly greater than the stoichiometric amount required for complete conversion of residual oxygen to moisture. More specifically, the flow rate of hydrogen is controlled to be at least 1.05 times the stoichiometric amount required for complete conversion of residual oxygen to moisture. The flow rate of a hydrocarbon gas is controlled in a way that it yields a reducing environment or the desired $pH_2/pH_2O$ ratio in the furnace.

The atmospheres suitable for brazing steels, sintering metal and ceramic powders, sealing glass to metals, and annealing non-ferrous alloys are produced in a continuous furnace operated at 750° C. and above by 1) flowing a mixture of non-cryogenically produced nitrogen and hydrogen through a catalytic reactor to convert residual oxygen to moisture and 2) introducing the reactor effluent stream containing nitrogen, unreacted hydrogen, and moisture mixed with a hydrocarbon gas into the heating zone of the furnace to convert moisture in-situ to a mixture of carbon monoxide and hydrogen by reaction with the hydrocarbon gas via water gas shift reaction and produce atmospheres suitable for heat treating metals. The flow rate of hydrogen is once again controlled in a way that it is slightly greater than the stoichiometric amount required for complete conversion of residual oxygen to moisture. More specifically, the flow rate of hydrogen is controlled to be at least 1.05 times the stoichiometric amount required for complete conversion of residual oxygen to moisture. The flow rate of a hydrocarbon gas is controlled in a way that it yields a reducing environment or the desired $pH_2/pH_2O$ ratio in the furnace.

EXPERIMENTAL PROCEDURE

Two different external catalytic reactors were used to convert residual oxygen present in non-cryogenically produced nitrogen with hydrogen. A small 1 in. diameter reactor packed with approximately 0.005 $ft^3$ of precious metal catalyst was used initially to study the reaction between residual oxygen and hydrogen. After these initial experiments, a 3 in. diameter reactor with 0.0736 ft of catalyst was designed and integrated with a heat treating furnace to demonstrate the present invention. The effluent stream from the catalytic reactor was mixed with a pre-determined amount of a hydrocarbon gas and introduced into either the shock zone (transition zone) or the heating zone of the furnace for the heat treating experiments.

Figure 2A:
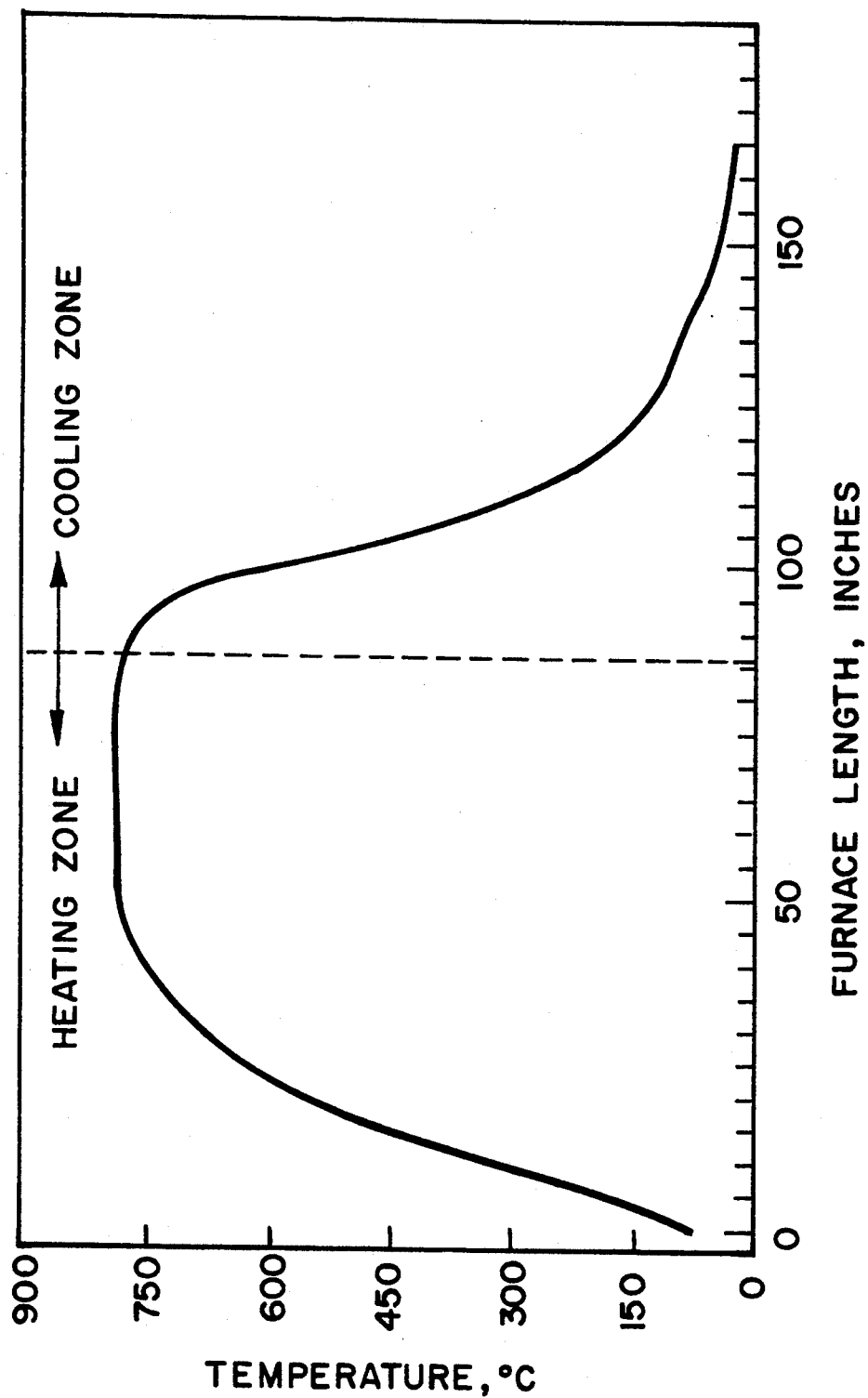
FIG. 2A is a plot of temperature against length of the furnace illustrating the experimental furnace profile for a heat treating temperature of 750° C.
Figure 2B:
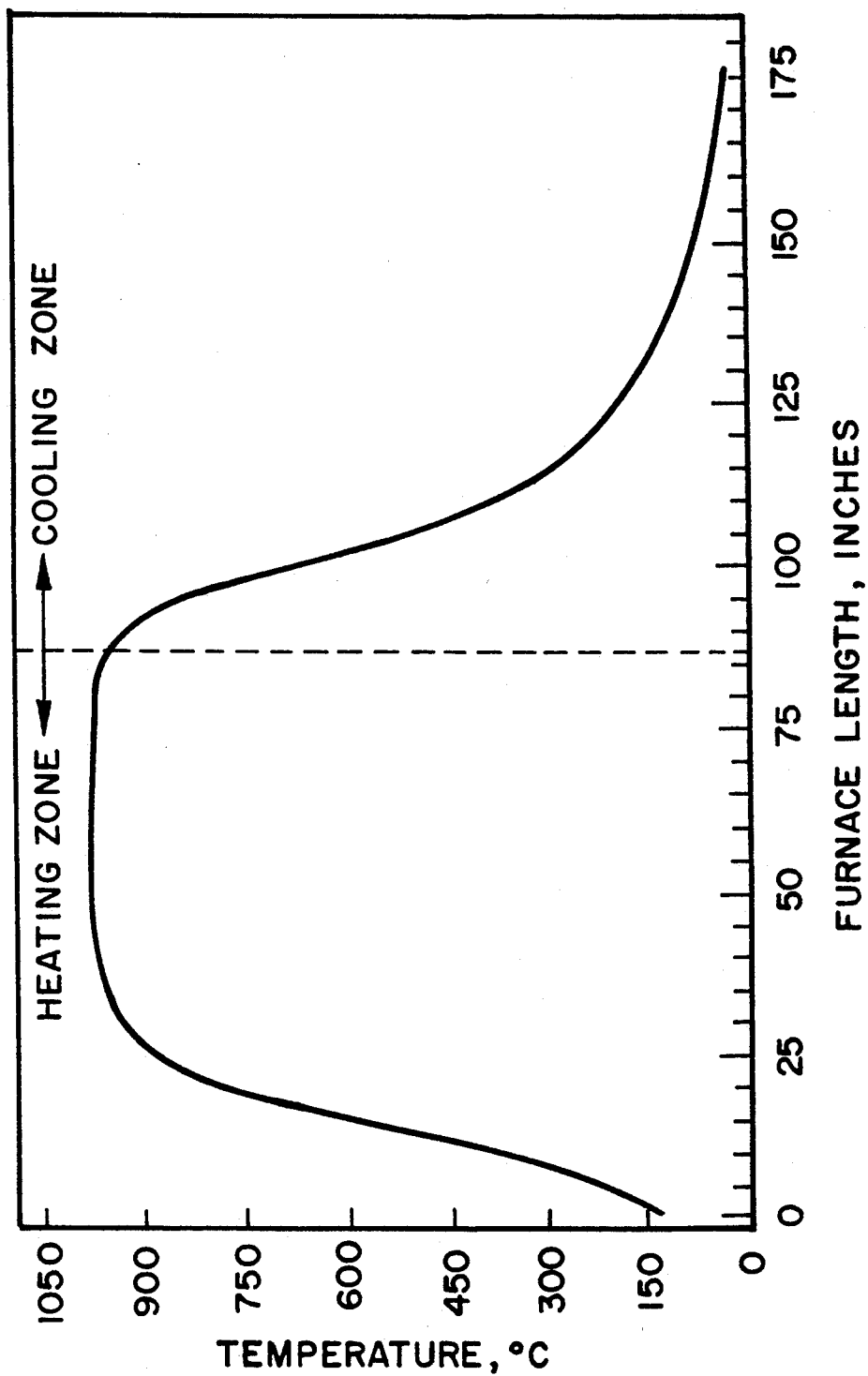
FIG. 2B is a plot similar to that of FIG. 2A for a heat treating temperature of 950° C.

A Watkins-Johnson conveyor belt furnace capable of operating up to a temperature of 1,150° C. was used in all the heat treating experiments. The heating zone of the furnace consisted of an 8.75 in. wide, about 4.9 in. high, and 86 in. long Inconel 601 muffle heated resistively from the outside. The cooling zone, made of stainless steel, was 8.75 in. wide, 3.5 in. high, and 90 in. long and was water cooled from the outside. An 8.25 in. wide flexible conveyor belt supported on the floor of the furnace was used to feed the samples to be heat treated through the heating and cooling zones of the furnace. A fixed belt speed of 6 inches per minute was used in all the experiments. The furnace shown schematically as 60 in FIG. 1 was equipped with physical curtains 62 and 64 both on entry 66 and exit 68 sections to prevent air from entering the furnace. The gaseous feed mixture containing nitrogen, unreacted hydrogen, moisture, added hydrocarbon gas, and less than 10 ppm oxygen was introduced into the transition zone (shock zone) located at 70 or in the heating zone (location 76) of the furnace during heat treating experiments. The shock zone feeding area 70 was located immediately after the heating zone of the furnace, as shown in FIG. 1. The other feeding area 76 was located in the heating zone 40 in. up stream from the transition zone, as shown in FIG. 1. This feed area was located well into the hottest section of the hot zone as shown by the furnace temperature profiles depicted in FIGS. 2A and 2B obtained at 750° C. and 950° C. normal furnace operating temperatures with 350 SCFH of pure nitrogen flowing into furnace 60. The temperature profiles show a rapid cooling of the parts as they move out of the heating zone and enter the cooling zone. Rapid cooling of the parts is commonly used by the heat treating industry to help in preventing oxidation of the parts from high levels of moisture and carbon dioxide in the cooling zone.

Samples of 8 in. long, 2 in. wide and 0.2 in. thick flat low carbon 1010 steels were used in most of the heat treating experiments. A few heat treating experiments were carried out to sinter parts made of steel powder. The atmosphere composition present in the heating zone of the furnace was determined by taking samples at multiple locations, as shown in FIG. 1. Likewise, samples were taken at multiple locations in the cooling zone to determine atmosphere composition (see FIG. 1 for the location of sampling ports). The samples were analyzed for residual oxygen, moisture (dew point), hydrogen, methane, CO, and $CO_2$. The experimental data is presented in the following tables and text.

TABLE 1

|  | Control Example 1A | Control Example 1B | Control Example 1C | Control Example 1D |
|---|---|---|---|---|
| Experiment No. | 12150-48-39 | 12150-96-166 | 12150-95-165 | 12150-96-167 |
| Heat Treating Temperature, °C. | 950 | 750 | 850 | 950 |
| Feed Gas Location | Transition Zone | Transition Zone | Transition Zone | Transition Zone |
| Feed Gas Device | Open Tube | Open Tube | Open Tube | Open Tube |
| Flow Rate of Nitrogen, SCFH | 350 | 350 | 350 | 350 |
| Amount of Hydrogen Added, % | 0.0 | 5.0 | 5.0 | 5.0 |
| Quality of Heat Treated Samples | Uniform Bright | Uniform Bright | Uniform Bright | Uniform Bright |

CONTROL EXAMPLE 1A

Samples of 1010 low carbon steel were annealed at 950° C. in the Watkins-Johnson furnace using 350 SCFH of cryogenically produced nitrogen containing less than 10 ppm of oxygen. The feed gas was introduced into the furnace through a ¾ inch diameter straight open ended tube located in the transition zone (location 70 in FIG. 1) of the furnace. This method of gas introduction is conventionally practiced in the heat treating industry. The feed gas was passed through the furnace for at least two hours to purge the furnace prior to annealing the samples.

The steel samples annealed in this example were bright without any signs of oxidation, as shown in Table 1. Examination of incoming and annealed materials showed no decarburization. This example showed that carbon steel can be annealed in pure nitrogen atmosphere without decarburization.

CONTROL EXAMPLE 1B

Samples of 1010 low carbon steel were annealed at 750° C. in the Watkins-Johnson furnace using a 350 SCFH flow rate of nitrogen-hydrogen mixture. The nitrogen gas was produced cryogenically and contained less than 10 ppm oxygen. It was mixed with 5% hydrogen by volume prior to introducing into the furnace. The feed gas was introduced into the furnace through a ¾ inch diameter straight open ended tube located in the transition zone (location 70 in FIG. 1) of the furnace. The feed gas was passed through the furnace for at least two hours to purge the furnace prior to annealing the samples.

The steel samples annealed in this example were bright without any signs of oxidation, as shown in Table 1. Examination of incoming material showed no decarburization while the steel sample annealed in nitrogen-hydrogen atmosphere produced marginal decarburization (the decarburization depth was less than 0.001 inches). This example showed that carbon steel can be annealed in nitrogen-hydrogen atmosphere without significant decarburization.

CONTROL EXAMPLE 1C

The carbon steel annealing process described in Control Example 1B was repeated with the exception of using 850° C. furnace temperature instead of 750° C., as shown in Table 1.

The steel samples annealed in this example were bright without any signs of oxidation, as shown in Table 1. Examination of incoming material showed no decarburization while the steel sample annealed in nitrogen-hydrogen atmosphere produced decarburization of approximately 0.001 inches. This example showed that carbon steel can be annealed in nitrogen-hydrogen atmosphere without significant decarburization.

CONTROL EXAMPLE 1D

The carbon steel annealing process described in Control Example 1B was repeated with the exception of using 950° C. furnace temperature instead of 750° C., as shown in Table 1.

The steel samples annealed in this example were bright without any signs of oxidation, as shown in Table 1. Examination of incoming material showed no decarburization while the steel sample annealed in nitrogen-hydrogen atmosphere produced decarburization of approximately 0.001 inches. This example showed that carbon steel can be annealed in nitrogen-hydrogen atmosphere without significant decarburization.

Control Examples 1A to 1D clearly showed that pure nitrogen or a mixture of pure nitrogen and hydrogen can be used to bright anneal carbon steels without significant decarburization in a continuous furnace.

TABLE 2

|  | Example 2A | Example 2B | Example 2C | Example 2D | Example 2E | Example 2F |
|---|---|---|---|---|---|---|
| Flow Rate of Feed Gas to Catalytic Reactor, SCFH | 100 | 200 | 100 | 100 | 100 | 200 |
| Feed Gas Composition |  |  |  |  |  |  |
| Nitrogen, % | 99.5 | 99.5 | 99.5 | 99.5 | 99.5 | 99.5 |
| Oxygen, % | 0.5 | 0.5 | 0.5 | 0.5 | 0.5 | 0.5 |
| Amount of Hydrogen Added, % | 1.5 | 1.5 | 1.5 | 1.5 | 1.5 | 1.5 |
| Catalyst Type | Pd on Alumina | Pd on Alumina | Pd on Alumina | Pd on Metallic Honeycomb | Pt/Pd on Metallic Honeycomb | Pt/Pd on Metallic Honeycomb |
| Gas Hourly Space Velocity, 1/hr | 20,000 | 40,000 | 20,000 | 20,000 | 20,000 | 40,000 |
| Effluent Gas Composition |  |  |  |  |  |  |
| Oxygen, ppm | <5 | <5 | <2 | <9 | <5 | <9 |
| Hydrogen, % | ~0.5 | ~0.5 | ~0.5 | ~0.5 | ~0.5 | ~0.5 |
| Pressure Drop Through Reactor, PSI | <0.5 | 2.5 | <0.5 | <0.1 | <0.1 | <0.5 |

EXAMPLE 2A

A nitrogen stream containing 0.5% (5,000 ppm) oxygen was mixed with 1.5% hydrogen and deoxygenated by passing the gaseous feed mixture through a 1" diameter catalytic reactor packed with 0.5% palladium metal catalyst supported on alumina pellets. The catalyst was supplied by Johnson Matthey of Wayne, Pa. The feed nitrogen composition used was similar to that commonly produced by non-cryogenic separation techniques. The amount of hydrogen used was 1.5 times the stoichiometric amount required to convert oxygen completely to water. The hourly flow rate of nitrogen stream through the reactor was 20,000 times the volume of the reactor (Gas Hourly Space Velocity or GHSV of 20,000 1/h), as shown in Table 2. The gaseous feed stream was at ambient temperature and the reactor was not heated from an external heating source.

The reactor effluent stream contained less than 5 ppm of residual oxygen, as shown in Table 2. The reactor was heated automatically to a temperature close to 100° C. due to exothermic nature of the reaction between oxygen and hydrogen. This example demonstrated that a catalytic reactor packed with palladium metal supported on alumina can be used to convert residual oxygen present in non-cryogenically produced nitrogen with hydrogen to moisture.

EXAMPLE 2B

The catalytic deoxygenation experiment described in Example 2A was repeated using the same reactor, catalyst, composition of nitrogen stream, and amount of hydrogen gas added with the exception of flowing nitrogen stream at GHSV of 40,000 1/h, as shown in Table 2. The reactor effluent stream contained less than 5 ppm of residual oxygen, as shown in Table 2. This example showed that a higher flow rate of non-cryogenically produced nitrogen can be used to convert oxygen with hydrogen to moisture in the presence of palladium catalyst.

EXAMPLE 2C

The catalytic deoxygenation experiment described in Example 2A was repeated using the same reactor, composition of nitrogen stream, flow rate of nitrogen stream, and amount of hydrogen added with the exception of utilizing 0.5% platinum metal catalyst supported on alumina pellets, as shown in Table 2. The catalyst was supplied by Johnson Matthey of Wayne, Pa. The reactor effluent stream contained less than 2 ppm of residual oxygen, as shown in Table 2. This example showed that a platinum metal catalyst supported on alumina can be used to convert oxygen present in the nitrogen stream with hydrogen to moisture.

EXAMPLE 2D

The catalytic deoxygenation experiment described in Example 2A was repeated using the same reactor, composition of nitrogen stream, flow rate of nitrogen stream, and amount of hydrogen added with the exception of utilizing palladium metal catalyst supported on a metallic honeycomb structure with a cell density of approximately 200 cells/in.$^2$. The honeycomb catalyst was supplied by Johnson Matthey of Wayne, Pa. The reactor effluent stream contained less than 9 ppm of residual oxygen, as shown in Table 2. This example showed that a palladium metal catalyst supported on a honeycomb structure can be used to convert oxygen present in the nitrogen stream with hydrogen to moisture.

EXAMPLE 2E

The catalytic deoxygenation experiment described in Example 2A was repeated using the same reactor, composition of nitrogen stream, flow rate of nitrogen stream, and amount of hydrogen added with the exception of utilizing platinum plus palladium metals catalyst supported on a metallic honeycomb structure with a cell density of approximately 200 cells/in.$^2$. The honeycomb catalyst was supplied by Johnson Matthey of Wayne, Pa. The reactor effluent stream contained less than 5 ppm of residual oxygen, as shown in Table 2. This example showed that a platinum/palladium metals catalyst supported on a honeycomb structure can be used to convert oxygen present in the nitrogen stream with hydrogen to moisture.

EXAMPLE 2F

The catalytic deoxygenation experiment described in Example 2E was repeated using the same reactor, composition of nitrogen stream, amount of hydrogen added, and platinum plus palladium metals catalyst supported on a metallic honeycomb structure with a cell density of approximately 200 cells/in.$^2$ with the exception of flowing nitrogen stream at GHSV of 40,000 1/h, as shown in Table 2. The reactor effluent stream contained less than 9 ppm of residual oxygen, as shown in Table 2. This example once again showed that a platinum/palladium metals catalyst supported on a honeycomb structure can be used to convert oxygen present in the nitrogen stream with hydrogen to moisture.

TABLE 3

|  | Example 3A | Example 3B |
|---|---|---|
| Flow Rate of Feed Gas to Catalytic Reactor, SCFH | 50 | 50 |
| Feed Gas Composition |  |  |
| Nitrogen, % | 99.5 | 99.5 |
| Oxygen, % | 0.5 | 0.5 |
| Amount of Hydrogen Added, % | 1.5 | 1.5 |
| Ammonia, ppm | 75 | 75 |
| Catalyst Type | Pd on Alumina Pellets | Pt/Pd on Metallic Honeycomb |
| Gas Hourly Space Velocity, 1/hr | 10,000 | 10,000 |
| Effluent Gas Composition |  |  |
| Oxygen, ppm | <2 | <2 |
| Hydrogen, % | ~0.5 | ~0.5 |

EXAMPLE 3A

The catalytic deoxygenation experiment described in Example 2A was repeated using the same reactor, catalyst, composition of nitrogen stream, and amount of hydrogen added with the exception of flowing nitrogen stream at GHSV of 10,000 1/h, as shown in Table 3. The feed hydrogen stream was mixed with 0.5% ammonia to simulate a hydrogen stream generated from an ammonia dissociator. The total amount of ammonia in the combined nitrogen and hydrogen stream fed to the reactor was about 75 ppm, as shown in Table 3. The reactor effluent stream contained less than 2 ppm of residual oxygen, as shown in Table 3. This example therefore showed that a hydrogen stream produced from an ammonia generator can be used to convert oxygen to moisture in the presence of palladium catalyst.

EXAMPLE 3B

The catalytic deoxygenation experiment described in Example 3A was repeated using the same reactor, flow rate of nitrogen stream, composition of nitrogen and hydrogen streams, amount of hydrogen added with the exception of utilizing platinum plus palladium metals catalyst supported on a metallic honeycomb structure with a cell density of approximately 200 cells/in.$^2$, as shown in Table 3. The reactor effluent stream contained less than 2 ppm of residual oxygen, as shown in Table 3. This example showed that a hydrogen stream produced from an ammonia generator can be used to convert oxygen to moisture in the presence of platinum/palladium catalyst.

Examples 2A to 2F showed that platinum group of metals can be used to react residual oxygen present in non-cryogenically produced nitrogen with hydrogen and convert it to moisture without supplying heat from an external source. Examples 3A and 3B showed that hydrogen produced by cracking ammonia in ammonia dissociators can be used to deoxygenate non-cryogenically produced nitrogen in the presence of platinum group of metals.

TABLE 4

|  | Example 4A | Example 4B | Example 4C | Example 4D | Example 4E | Example 4E | Example 4G |
| --- | --- | --- | --- | --- | --- | --- | --- |
| Experiment No. | 12160-42-51 | 12160-42-52 | 12160-42-53 | 12160-43-54 | 12160-75-108 | 12160-76-109 | 12160-76-110 |
| Heat Treating Temperature, °C. | 950 | 950 | 950 | 950 | 950 | 950 | 950 |
| Feed Gas Location | Transition Zone | Transition Zone | Transition Zone | Transition Zone | Transition Zone | Transition Zone | Transition Zone |
| Feed Gas Device | Open Tube | Open Tube | Open Tube | Open Tube | Open Tube | Open Tube | Open Tube |
| Catalytic Reactor Effluent Gas Composition | | | | | | | |
| Residual Oxygen, ppm | <2 | <2 | <2 | <2 | <2 | <2 | <2 |
| Hydrogen, % | 0.2 | 2.0 | 3.0 | 4.0 | 0.2 | 0.2 | 0.2 |
| Moisture, % | 1.0 | 1.0 | 1.0 | 1.0 | 1.0 | 1.0 | 1.0 |
| Natural Gas (Methane) Added to Effluent Gas, % | 0.0 | 0.0 | 0.0 | 0.0 | 1.0 | 2.0 | 3.0 |
| Heating Zone Atmosphere Composition | | | | | | | |
| Oxygen, ppm | <2 | <2 | <2 | <2 | <2 | <2 | <2 |
| Carbon Monoxide, % | 0.0 | 0.0 | 0.0 | 0.0 | 0.85 | 1.00 | 1.00 |
| Hydrogen, % | 0.2 | 2.0 | 3.0 | 3.8 | 2.60 | 3.00 | 3.00 |
| Methane, % | N/A | N/A | N/A | N/A | 0.13 | 0.90 | 1.90 |
| Dew Point, °C. | 7.4 | 7.4 | 7.8 | 7.8 | −22.9 | −28.9 | −34.5 |
| Cooling Zone Atmosphere Composition | | | | | | | |
| Oxygen, ppm | <2 | <2 | <2 | <2 | <2 | <3 | <3 |
| Carbon Monoxide, % | 0.0 | 0.0 | 0.0 | 0.0 | 0.05 | 0.10 | 0.10 |
| Hydrogen, % | 0.2 | 2.0 | 3.0 | 4.0 | 0.15 | 0.30 | 0.30 |
| Methane, % | N/A | N/A | N/A | N/A | 0.98 | 1.92 | 2.95 |
| Dew Point, °C. | 10.9 | 10.8 | 10.8 | 10.6 | 9.6 | 9.6 | 9.2 |
| Quality of Heat Treated Samples | Uniform, Tightly Packed Oxide | Non-Uniform Oxide | Uniform Bright Packed | Uniform Bright Packed | Uniform, Tightly Packed Oxide | Uniform, Tightly Packed Oxide | Uniform, Tightly Oxide |

Note:
Negligible amount of carbon dioxide was detected in the heating and cooling zones.

EXAMPLE 4A

A 350 SCFH of nitrogen stream containing 0.5% (5,000 ppm) oxygen was mixed with 1.2% hydrogen and deoxygenated by passing the gaseous feed mixture through a 3" diameter catalytic reactor at 4,800 l/h GHSV using palladium metal catalyst similar to the one described in Example 2A. The amount of hydrogen used was 1.2 times the stoichiometric amount required for completely converting oxygen to water. The reactor effluent stream contained less than 2 ppm residual oxygen and 0.2% unreacted hydrogen.

The reactor effluent stream with a $pH_2/pH_2O$ ratio of about 0.2 was used to anneal 1010 low carbon steel samples at 950° C. in the Watkins-Johnson furnace. The effluent stream was introduced into the furnace through a ¾ inch diameter straight open ended tube located in the transition zone (location 70 in FIG. 1) of the furnace. This method of gas introduction is conventionally practiced in the heat treating industry. The feed gas was passed through the furnace for at least two hours to purge the furnace prior to annealing the samples.

The steel samples annealed in this example were oxidized uniformly in a controlled manner due to the presence of low $pH_2/pH_2O$ ratio both in the heating and cooling zones of the furnace, as shown in Table 4. This example showed that low carbon steels cannot be bright annealed in non-cryogenically produced nitrogen which has been deoxygenated with slightly more than a stoichiometric amount of hydrogen in a catalytic reactor.

EXAMPLE 4B

The catalytic deoxygenation of nitrogen described in Example 4A was repeated using the same reactor, catalyst, composition and flow rate of nitrogen stream, and GHSV with the exception of using 3.0% hydrogen. The amount of hydrogen used was 3 times the stoichiometric amount required for completely converting oxygen to water. The reactor effluent stream contained less than 2 ppm residual oxygen and 2.0% unreacted hydrogen. The reactor effluent stream with a $pH_2/pH_2O$ ratio of about 2 was used to anneal 1010 low carbon steel samples at 950° C. in the furnace using the identical procedure as described in Example 4A.

The steel samples annealed in this example were oxidized non-uniformly due to the presence of low $pH_2/pH_2O$ ratio both in the heating and cooling zones of the furnace, as shown in Table 4. This example showed that low carbon steels cannot be bright annealed in non-cryogenically produced nitrogen which has been deoxygenated with hydrogen to yield an effluent stream containing a $pH_2/pH_2O$ ratio of about 2.

EXAMPLE 4C

The catalytic deoxygenation of nitrogen described in Example 4A was repeated using the same reactor, catalyst, composition and flow rate of nitrogen stream, and GHSV with the exception of using 4.0% hydrogen. The amount of hydrogen used was 4 times the stoichiometric amount required for completely converting oxygen to water. The reactor effluent stream contained less than 2 ppm of residual oxygen and 3.0% unreacted hydrogen. The reactor effluent stream with a $pH_2/pH_2O$ ratio of about 3 was used to anneal 1010 low carbon steel samples at 950° C. in the furnace using the identical procedure as described in Example 4A.

The steel samples annealed in this example were bright without any signs of oxidation, as shown in Table 4. The $pH_2/pH_2O$ ratio both in the heating and cooling zones of the furnace was high enough to be reducing to carbon steel. Examination of incoming material showed no decarburization while the steel sample annealed in non-cryogenically produced nitrogen which has been pretreated to convert residual oxygen to moisture produced decarburization of approximately 0.0065 inches. This example showed that low carbon steels cannot be bright annealed without significant use of hydrogen gas and decarburization in non-cryogenically produced nitrogen which has been treated to convert residual oxygen to moisture.

EXAMPLE 4D

The catalytic deoxygenation of nitrogen described in Example 4A was repeated using the same reactor, catalyst, composition and flow rate of nitrogen stream, and GHSV with the exception of using 5.0% hydrogen. The amount of hydrogen used was 5 times the stoichiometric amount required for completely converting oxygen to water. The reactor effluent stream contained less than 2 ppm of residual oxygen and 4.0% unreacted hydrogen. The reactor effluent stream with a $pH_2/pH_2O$ ratio of about 4 was used to anneal 1010 low carbon steel samples at 950° C. in the furnace using the identical procedure as described in Example 4A.

The steel samples annealed in this example were bright without any signs of oxidation, as shown in Table 4. The $pH_2/pH_2O$ ratio both in the heating and cooling zones of the furnace was high enough to be reducing to carbon steel. Examination of incoming material showed no decarburization while the steel sample annealed in the non-cryogenically produced nitrogen which has been pretreated to convert residual oxygen to moisture produced decarburization of approximately 0.0065 inches. This example once again showed that low carbon steels cannot be bright annealed without significant use of hydrogen gas and decarburization in non-cryogenically produced nitrogen which has been treated to convert residual oxygen to moisture.

EXAMPLE 4E

A 350 SCFH of nitrogen stream containing 0.5% (5,000 ppm) oxygen was mixed with 1.2% hydrogen and deoxygenated by passing the gaseous feed mixture through a 3" diameter catalytic reactor at 4,800 l/h GHSV using palladium metal catalyst similar to the one described in Example 2A. The amount of hydrogen used was 1.2 times the stoichiometric amount required for completely converting oxygen water. The reactor effluent stream contained less than 2 ppm residual oxygen and 0.2% unreacted hydrogen.

The reactor effluent stream with a $pH_2/pH_2O$ ratio of about 0.2 was mixed with 1.0% natural gas and used to anneal 1010 low carbon steel samples at 950° C. in the furnace. The effluent stream mixed with natural gas was introduced into the furnace through an open tube located in the transition zone, as described in Example 4A. The effluent stream was mixed with natural gas in an attempt to convert moisture to a mixture of carbon monoxide and hydrogen with natural gas via water gas shift reaction and produce atmosphere in-situ for bright annealing steel. The feed gas was passed through the furnace for at least two hours to purge the furnace prior to annealing the samples.

The steel samples annealed in this example were oxidized uniformly in a controlled manner due to oxidizing nature of the atmosphere in the cooling zone, as shown in Table 4. This example showed that low carbon steels cannot be bright annealed in non-cryogenically produced nitrogen which has been deoxygenated with slightly more than stoichiometric amount of hydrogen in a catalytic reactor even if it is mixed with 1% natural gas.

EXAMPLE 4F

A nitrogen stream similar to the one described in Example 4E was deoxygenated in a catalytic reactor using the identical procedure as described in Example 4E. The reactor effluent stream with a $pH_2/pH_2O$ ratio of about 0.2 was mixed with 2.0% natural gas and used to anneal 1010 low carbon steel samples at 950° C. in the furnace using the identical procedure as described in Example 4E.

The steel samples annealed in this example were oxidized uniformly in a controlled manner due to oxidizing nature of the atmosphere in the cooling zone, as shown in Table 4. This example showed that low carbon steels cannot be bright annealed in non-cryogenically produced nitrogen which has been deoxygenated with slightly more than a stoichiometric amount of hydrogen in an external catalytic reactor even if it is mixed with 2% natural gas.

EXAMPLE 4G

A nitrogen stream similar to the one described in Example 4E was deoxygenated in a catalytic reactor using the identical procedure as described in Example 4E. The reactor effluent stream with a $pH_2/pH_2O$ ratio of about 0.2 was mixed with 3.0% natural gas and used to anneal 1010 low carbon steel samples at 950° C. in the furnace using the identical procedure as described in Example 4E.

The steel samples annealed in this example were oxidized uniformly in a controlled manner once again due to oxidizing nature of the atmosphere in the cooling zone, as shown in Table 4. This example showed that low carbon steels cannot be bright annealed in non-cryogenically produced nitrogen which has been deoxygenated with slightly more than a stoichiometric amount of hydrogen in an external catalytic reactor even if it is mixed with 3% natural gas.

Examples 4A and 4B showed that the use of non-cryogenically produced nitrogen pretreated to convert residual oxygen to moisture in a catalytic reactor with slightly more than stoichiometric amount of hydrogen results in annealed steel samples with oxide surface finish due to oxidizing nature of the atmosphere. Examples 4C and 4D, on the other hand, showed that carbon steel samples can be annealed with bright surface finish provided the flow rate of hydrogen used to convert residual oxygen present in the non-cryogenically produced nitrogen in the catalytic reactor is equal to or more than 4 times the stoichiometric amount required for converting oxygen completely to water. These examples also showed that bright steel product will be decarburized even with excessive use of hydrogen gas.

The annealing results in Examples 4E to 4G showed that the use of non-cryogenically produced nitrogen pretreated to convert residual oxygen to moisture in a catalytic reactor with slightly more than stoichiometric amount of hydrogen and mixed with natural gas results in annealed samples with oxide surface finish due to oxidizing nature of the atmosphere.

Finally, these examples revealed that carbon steels cannot be bright annealed in non-cryogenically produced nitrogen without excessive and uneconomical use of hydrogen gas and without significant decarburization.

Several experiments were conducted to produce atmospheres suitable for bright, decarburized annealing and bright, decarburized-free annealing of carbon steels with the use of economical amount of hydrogen in the integrated two-step process of the present invention. These results are summarized in Table 5.

used was 1.2 times the stoichiometric amount required for completely converting oxygen to water. The reactor effluent stream contained less than 2 ppm residual oxygen and 0.2% unreacted hydrogen. This stream was mixed with natural gas and introduced into the heating zone of the Watkins-Johnson furnace to produce atmo-

TABLE 5

|  | Example 5A | Example 5B | Example 5C | Example 5D | Example 5E |
|---|---|---|---|---|---|
| Experiment No. | 12160-44-56 | 12160-44-57 | 12160-44-58 | 12150-80-119 | 12150-80-122 |
| Heat Treating Temperature, °C. | 950 | 950 | 950 | 950 | 950 |
| Feed Gas Location | Heating Zone | Heating Zone | Heating Zone | Heating Zone | Heating Zone |
| Feed Gas Device | Open Tube | Open Tube | Open Tube | Diffuser | Diffuser |
| Catalytic Reactor Effluent Gas Composition |  |  |  |  |  |
| Residual Oxygen, ppm | <2 | <2 | <2 | <2 | <2 |
| Hydrogen, % | 0.2 | 0.2 | 0.2 | 0.2 | 0.2 |
| Moisture, % | 1.0 | 1.0 | 1.0 | 1.0 | 1.0 |
| Natural Gas (Methane) Added to Effluent Gas, % | 1.0 | 2.0 | 3.0 | 1.0 | 2.0 |
| Heating Zone Atmosphere Composition |  |  |  |  |  |
| Oxygen, ppm | <3 | <3 | <3 | <3 | <3 |
| Carbon Monoxide, % | 0.80 | 1.00 | 1.00 | 0.80 | |
| Hydrogen, % | 2.40 | 3.00 | 3.00 | 2.40 | 3.00 |
| Methane, % | 0.20 | 1.00 | 2.00 | 0.20 | 0.95 |
| Dew Point, °C. | −30.4 | −34.0 | −36.4 | −31.3 | −37.7 |
| Cooling Zone Atmosphere Composition |  |  |  |  |  |
| Oxygen, ppm | <3 | <3 | <3 | <3 | <3 |
| Carbon Monoxide, % | 0.45 | 0.70 | 0.70 | 0.60 | 1.00 |
| Hydrogen, % | 1.20 | 2.10 | 2.10 | 1.90 | 3.00 |
| Methane, % | 0.45 | 1.30 | 2.30 | 0.35 | 1.00 |
| Dew Point, °C. | −10.4 | −12.6 | −15.8 | −15.7 | −26.2 |
| Quality of Heat Treated Samples | Uniform Bright | Uniform Bright | Uniform Bright | Uniform Bright | Uniform Bright |

|  | Example 5F | Example 5G | Example 5H | Example 5I | Example 5J | Example 5K |
|---|---|---|---|---|---|---|
| Experiment No. | 12150-80-123 | 12150-81-125 | 12150-85-133 | 12150-84-130 | 12150-87-139 | 12150-85-135 |
| Heat Treating Temperature, °C. | 950 | 950 | 850 | 850 | 850 | 750 |
| Feed Gas Location | Heating Zone | Heating Zone | Heating Zone | Heating Zone | Heating Zone | Heating Zone |
| Feed Gas Device | Diffuser (See FIG. 3C) | Diffuser | Diffuser | Diffuser | Diffuser | Diffuser (See FIG. 3C) |
| Catalytic Reactor Effluent Gas Composition |  |  |  |  |  |  |
| Residual Oxygen, ppm | <2 | <2 | <2 | <2 | <2 | <2 |
| Hydrogen, % | 0.2 | 0.2 | 0.2 | 0.2 | 0.2 | 0.2 |
| Moisture, % | 1.0 | 1.0 | 1.0 | 1.0 | 1.0 | 1.0 |
| Natural Gas (Methane) Added to Effluent Gas, % | 2.5 | 3.0 | 1.5 | 2.0 | 2.5 | 1.5 |
| Heating Zone Atmosphere Composition |  |  |  |  |  |  |
| Oxygen, ppm | <3 | <2 | <3 | <3 | <3 | <3 |
| Carbon Monoxide, % | 1.00 | 1.00 | 0.70 | 0.70 | 0.70 | 0.60 |
| Hydrogen, % | 3.00 | 3.00 | 2.10 | 2.10 | 2.10 | 1.55 |
| Methane, % | 1.45 | 1.95 | 0.80 | 1.30 | 1.80 | 0.90 |
| Dew Point, °C. | −47.6 | −50.9 | −26.4 | −29.1 | −27.8 | −12.8 |
| Cooling Zone Atmosphere Composition |  |  |  |  |  |  |
| Oxygen, ppm | <3 | <2 | <3 | <3 | <3 | <3 |
| Carbon Monoxide, % | 1.00 | 1.00 | 0.55 | 0.60 | 0.60 | 0.50 |
| Hydrogen, % | 3.00 | 3.00 | 1.60 | 1.70 | 1.70 | 1.45 |
| Methane, % | 1.50 | 2.00 | 0.90 | 1.35 | 1.85 | 1.00 |
| Dew Point, °C. | −29.7 | −31.6 | −14.8 | −16.8 | −17.6 | −10.7 |
| Quality of Heat Treated Samples | Uniform Bright | Uniform Bright | Uniform Bright | Uniform Bright | Uniform Bright | Uniform Bright |

Note:
Negligible amount of carbon dioxide was detected in the heating and cooling zones.

EXAMPLE 5

A 350 SCFH of nitrogen stream containing 0.5% (5,000 ppm) oxygen was mixed with 1.2% hydrogen and deoxygenated by passing the gaseous feed mixture through a 3″ diameter catalytic reactor at 4,800 1/h GHSV using palladium metal catalyst similar to the one described in Example 2A. The amount of hydrogen spheres suitable for bright, decarburized annealing and bright, decarburized-free annealing of carbon steels in several examples described below.

EXAMPLE 5A

The reactor effluent stream from Example 5 with a $pH_2/pH_2O$ ratio of about 0.2 was mixed with 1% natural gas and used to anneal 1010 low carbon steel samples at 950° C. in the furnace. It was introduced into the heating zone of the furnace through a ½ in. diameter steel tube fitted with a ¾ in. diameter elbow with the opening facing down, i.e., facing the samples. The feed tube was inserted into the furnace through cooling zone to introduce feed gas into the heating zone of the furnace 60 at location 76 in FIG. 1. The effluent stream was mixed with natural gas in an attempt to convert moisture to a mixture of carbon monoxide and hydrogen with natural gas via water gas shift reaction and produce atmosphere in-situ for bright annealing steel. The feed gas was passed through the furnace for at least two hours to purge the furnace prior to annealing the samples.

The steel samples annealed in this example were bright without any signs of surface oxidation due to reducing nature of the atmosphere both in the heating and cooling zones of the furnace, as shown in Table 5. The addition of natural gas to the gaseous feed mixture facilitated water gas shift reaction in the furnace, producing hydrogen and carbon monoxide needed for bright annealing steel. It also helped in lowering the dew point of the atmosphere both in the heating and cooling zones of the furnace. The steel sample annealed in this example was examined for decarburization. Examination of incoming material showed no decarburization while the steel sample annealed in this example produced surface decarburization to a depth of approximately 0.0055 inches. The extent of decarburization, however, was lower than Examples 4C to 4D.

This example showed that low carbon steels can be bright annealed at 950° C. with reduced degree of decarburization in non-cryogenically produced nitrogen that has been deoxygenated with the use of an economical amount of hydrogen in a catalytic reactor provided the deoxygenated stream is mixed with proper amount of natural gas and introduced into the heating zone of a continuous furnace.

EXAMPLE 5B

Example 5A was repeated using the identical procedure with the exception of using 2.0% natural gas. The steel samples annealed in this example were bright without any signs of surface oxidation due to reducing nature of the atmosphere both in the heating and cooling zones of the furnace, as shown in Table 5. Examination of incoming material showed no decarburization while the steel sample annealed in this example produced surface decarburization to a depth of approximately 0.0045 inches. The extent of decarburization was lower than Examples 4C, 4D and 5A.

This example showed that low carbon steels can be bright annealed at 950° C. with reduced degree of decarburization in non-cryogenically produced nitrogen that has been deoxygenated with the use of an economical amount of hydrogen in an external catalytic reactor provided the deoxygenated stream is mixed with proper amount of natural gas and introduced into the heating zone of a continuous furnace.

EXAMPLE 5C

Example 5A was repeated using the identical procedure with the exception of using 3.0% natural gas. The steel samples annealed in this example were bright without any signs of surface oxidation due to reducing nature of the atmosphere both in the heating and cooling zones of the furnace, as shown in Table 5. Examination of incoming material showed no decarburization while the steel sample annealed in this example produced surface decarburization to a depth of approximately 0.0040 inches. The extent of decarburization was lower than Examples 4C, 4D, 5A, and 5B.

This example showed that low carbon steels can be bright annealed at 950° C. with reduced degree of decarburization in non-cryogenically produced nitrogen that has been deoxygenated with the use of an economical amount of hydrogen in an external catalytic reactor provided the deoxygenated stream is mixed with proper amount of natural gas and introduced into the heating zone of a continuous furnace.

Examples 5A to 5C showed that a non-cryogenically produced nitrogen can be used to bright anneal carbon steels with some decarburization using an economical amount of hydrogen and the integrated two-step process of the present invention. They also showed that the extent of decarburization can be controlled by adjusting the amount of hydrocarbon gas added to the gaseous feed mixture.

EXAMPLE 5D

The reactor effluent stream from Example 5 with a $pH_2/pH_2O$ ratio of about 0.2 was mixed with 1% natural gas and used to anneal 1010 low carbon steel samples at 950° C. in the furnace. It was introduced into the heating zone of the furnace (location 76 in FIG. 1) through a porous diffuser. A generally cylindrical shaped diffuser shown and described in U.S. Pat. application Ser. No. 07/727,806 comprising a top half of a ¾ in. diameter, 6 in. long porous Inconel material with a number of ⅛ in. diameter holes was assembled. Bottom half of the diffuser was a gas impervious Inconel with one end of the diffuser capped and the other end attached to a ½ in. diameter stainless steel feed tube inserted into the furnace 60 through the cooling end vestibule 68. The bottom half of diffuser was positioned parallel to the parts 16' (prime) being treated thus essentially directing the flow of feed gas towards the hot ceiling of the furnace. The diffuser therefore helped in preventing the direct impingement of feed gas on the parts and providing extra time for moisture present in the feed gas to react with natural gas before coming in contact with the samples 16'. The feed gas was passed through the furnace for at least two hours to purge the furnace prior to annealing the samples.

The steel samples annealed in this example were bright without any signs of surface oxidation due to reducing nature of the atmosphere both in the heating and cooling zones of the furnace, as shown in Table 5. The addition of natural gas to the gaseous feed mixture facilitated water gas shift reaction in the furnace, producing hydrogen and carbon monoxide needed for bright annealing steel. It also helped in lowering the dew point of the atmosphere both in the heating and cooling zones of the furnace. Examination of incoming material showed no decarburization while the steel sample annealed in this example produced decarburization of approximately 0.0055 inches. The extent of decarburization was lower than Examples 4C and 4D, but was similar to that observed in Example 5A.

This example showed that low carbon steels can be bright annealed at 950° C. with reduced degree of decarburization in non-cryogenically produced nitrogen that has been deoxygenated with the use of an economical amount of hydrogen in an external catalytic reactor provided the deoxygenated stream is mixed with proper amount of natural gas and introduced into the heating zone of a continuous annealing furnace.

EXAMPLE 5E

Example 5D was repeated using the identical procedure with the exception of using 2.0% natural gas. The steel samples annealed in this example were bright without any signs of surface oxidation due to reducing nature of the atmosphere both in the heating and cooling zones of the furnace, as shown in Table 5. Examination of incoming material showed no decarburization while the steel sample annealed in this example produced surface decarburization to a depth of approximately 0.0030 inches. The extent of decarburization was considerably lower than Examples 4C and 4D and Examples 5A to 5D.

This example showed that low carbon steels can be bright annealed at 950° C. with considerably lower degree of decarburization in non-cryogenically produced nitrogen that has been deoxygenated with economical amount of hydrogen in an external catalytic reactor provided the deoxygenated stream is mixed with proper amount of natural gas and introduced into the heating zone of a continuous furnace through a diffuser instead of an open tube.

EXAMPLE 5F

Example 5D was repeated using the identical procedure with the exception of using 2.5% natural gas. The steel samples annealed in this example were bright without any signs of surface oxidation due to reducing nature of the atmosphere both in the heating and cooling zones of the furnace, as shown in Table 5. Examination of incoming material showed no decarburization while the steel sample annealed in this example produced marginal surface decarburization to a depth of approximately 0.0020 inches.

This example showed that low carbon steels can be bright annealed at 950° C. with marginal decarburization in non-cryogenically produced nitrogen that has been deoxygenated with economical amount of hydrogen in an external catalytic reactor provided the deoxygenated stream is mixed with proper amount of natural gas and introduced into the heating zone of a continuous furnace through a diffuser instead of an open tube.

EXAMPLE 5G

Example 5D was repeated using the identical procedure with the exception of using 3.0% natural gas. The steel samples annealed in this example were bright without any signs of surface oxidation, as shown in Table 5. Examination of incoming material showed no decarburization while the steel sample annealed in this example produced insignificant or no decarburization.

This example showed that low carbon steels can be bright annealed at 950° C. with insignificant or no decarburization in non-cryogenically produced nitrogen that has been deoxygenated with economical amount of hydrogen in an external catalytic reactor provided the deoxygenated stream is mixed with proper amount of natural gas and introduced into the heating zone of a continuous furnace through a diffuser instead of an open tube.

EXAMPLE 5H

The reactor effluent stream from Example 5 with a $pH_2/pH_2O$ ratio of about 0.2 was mixed with 1.5% natural gas and used to anneal 1010 low carbon steel samples at 850° C. in the furnace. It was introduced into the heating zone of the furnace (location 76 in FIG. 1) through a porous diffuser similar to the one described in Example 5D.

The steel samples annealed in this example were bright without any signs of surface oxidation due to reducing nature of the atmosphere both in the heating and cooling zones of the furnace, as shown in Table 5. The addition of natural gas to the gaseous feed mixture facilitated water gas shift reaction in the furnace, producing hydrogen and carbon monoxide needed for bright annealing steel. It also helped in lowering the dew point of the atmosphere both in the heating and cooling zones of the furnace. Examination of incoming material showed no decarburization while the steel sample annealed in this example produced surface decarburization to a depth of approximately 0.006 inches.

This example showed that low carbon steels can be bright annealed at 850° C. with some decarburization in non-cryogenically produced nitrogen that has been deoxygenated with economical amount of hydrogen in an external catalytic reactor provided the deoxygenated stream is mixed with proper amount of natural gas and introduced into the heating zone of a continuous annealing furnace.

EXAMPLE 5I

Example 5H was repeated using the identical procedure with the exception of using 2.0% natural gas. The steel samples annealed in this example were bright without any signs of surface oxidation due to reducing nature of the atmosphere both in the heating and cooling zones of the furnace, as shown in Table 5. Examination of incoming material showed no decarburization while the steel sample annealed in this example produced surface decarburization to a depth of approximately 0.0045 inches. The extent of decarburization was considerably lower than Example 5H.

This example showed that low carbon steels can be bright annealed at 850° C. with considerably lower degree of decarburization in non-cryogenically produced nitrogen that has been deoxygenated with economical amount of hydrogen in an external catalytic reactor provided the deoxygenated stream is mixed with proper amount of natural gas and introduced into the heating zone of a continuous furnace through a diffuser.

EXAMPLE 5J

Example 5H was repeated using the identical procedure with the exception of using 2.5% natural gas. The steel samples annealed in this example were bright without any signs of surface oxidation due to reducing nature of the atmosphere both in the heating and cooling zones of the furnace, as shown in Table 5. Examination of incoming material showed no decarburization while the steel sample annealed in this example produced surface decarburization to a depth of approximately 0.0035 inches. The extent of decarburization was considerably lower than Examples 5H and 5I.

This example showed that low carbon steels can be bright annealed at 850° C. with considerably lower degree of decarburization in non-cryogenically produced nitrogen that has been deoxygenated with economical amount of hydrogen in an external catalytic reactor provided the deoxygenated stream is mixed with proper amount of natural gas and introduced into the heating zone of a continuous furnace through a diffuser.

EXAMPLE 5K

The reactor effluent stream from Example 5 with a $pH_2/pH_2O$ ratio of about 0.2 was mixed with 1.5% natural gas and used to anneal 1010 low carbon steel samples at 750° C. in the furnace. It was introduced into the heating zone of the furnace (location 76 in FIG. 1) through a porous diffuser similar to the one described in Example 5D.

The steel samples annealed in this example were bright without any signs of surface oxidation due to reducing nature of the atmosphere both in the heating and cooling zones of the furnace, as shown in Table 5. The addition of natural gas to the gaseous feed mixture facilitated water gas shift reaction in the furnace, producing hydrogen and carbon monoxide needed for bright annealing steel. It also helped in lowering the dew point of the atmosphere both in the heating and cooling zones of the furnace. Examination of incoming material showed no decarburization while the steel sample annealed in this example produced surface decarburization to a depth of approximately 0.0078 inches.

This example showed that low carbon steels can be bright annealed at 750° C. with some decarburization in non-cryogenically produced nitrogen that has been deoxygenated with an economical amount of hydrogen in an external catalytic reactor provided the deoxygenated stream is mixed with proper amount of natural gas and introduced into the heating zone of a continuous annealing furnace.

Examples 5D to 5K showed that a non-cryogenically produced nitrogen can be used to bright anneal carbon steels with some or no decarburization using an economical amount of hydrogen and the integrated two-step process of the present invention. These examples showed the benefits of using a diffuser for introducing gaseous feed mixture into the heating zone of a continuous furnace over an open tube—the diffuser helped in increasing the degree of water gas shift reaction in the furnace and decreasing the extent of decarburization of annealed carbon steel samples. These examples showed that the extent of decarburization depends upon the temperature used during heat treating. Furthermore, they showed that the extent of decarburization can be controlled by adjusting the amount of hydrocarbon gas added to the gaseous feed mixture.

TABLE 6

|  | Example 6A | Example 6B | Example 6C | Example 6D | Example 6E | Example 6F |
|---|---|---|---|---|---|---|
| Experiment No. | 12150-88-144 | 12150-89-145 | 12150-89-146 | 12150-87-141 | 12150-88-142 | 12150-88-143 |
| Heat Treating Temperature, °C. | 950 | 950 | 950 | 850 | 850 | 850 |
| Feed Gas Location | Heating Zone | Heating Zone | Heating Zone | Heating Zone | Heating Zone | Heating Zone |
| Feed Gas Device | Diffuser | Diffuser | Diffuser | Diffuser | Diffuser | Diffuser |
| Feed Gas Composition |  |  |  |  |  |  |
| Residual Oxygen, ppm | <2 | <2 | <2 | <2 | <2 | <2 |
| Hydrogen, % | 0.1 | 0.1 | 0.1 | 0.1 | 0.1 | 0.1 |
| Moisture, % | 0.5 | 0.5 | 0.5 | 0.5 | 0.5 | 0.5 |
| Natural Gas (Methane) Added to Effluent Gas, % | 1.5 | 2.0 | 2.5 | 1.5 | 2.0 | 2.5 |
| Heating Zone Atmosphere Composition |  |  |  |  |  |  |
| Oxygen, ppm | <3 | <2 | <2 | <2 | <2 | <3 |
| Carbon Monoxide, % | 0.50 | 0.50 | 0.50 | 0.45 | 0.50 | 0.50 |
| Hydrogen, % | 1.50 | 1.50 | 1.50 | 1.35 | 1.50 | 1.50 |
| Methane, % | 0.90 | 1.40 | 1.85 | 1.00 | 1.50 | 1.90 |
| Dew Point, °C. | −51.6 | −57.4 | −57.3 | −39.2 | −43.5 | −48.0 |
| Cooling Zone Atmosphere Composition |  |  |  |  |  |  |
| Oxygen, ppm | <3 | <2 | <2 | <2 | <3 | <2 |
| Carbon Monoxide, % | 0.50 | 0.50 | 0.50 | 0.40 | 0.40 | 0.40 |
| Hydrogen, % | 1.50 | 1.50 | 1.50 | 1.20 | 1.20 | 1.20 |
| Methane, % | 0.95 | 1.45 | 1.90 | 1.10 | 1.60 | 2.00 |
| Dew Point, °C. | −35.7 | −37.7 | −40.1 | −29.0 | −33.4 | −33.9 |
| Quality of Heat Treated Samples | Uniform Bright | Uniform Bright | Uniform Bright | Uniform Bright | Uniform Bright | Uniform Bright |

Note:
Negligible amount of carbon dioxide was detected in the heating and cooling zones.

EXAMPLE 6

A 350 SCFH of nitrogen stream containing 0.25% (2,500 ppm) oxygen was mixed with 0.6% hydrogen and deoxygenated by passing the gaseous feed mixture through a 3" diameter catalytic reactor at 4,800 1/h GHSV using palladium metal catalyst similar to the one described in Example 2A. The amount of hydrogen used was 1.2 times the stoichiometric amount required for completely converting oxygen to water. The reactor effluent stream contained less than 2 ppm residual oxygen and 0.1% unreacted hydrogen. This stream was mixed with natural gas and introduced into the heating zone of the furnace to produce atmospheres suitable for bright, decarburized annealing and bright, decarburized-free annealing of carbon steels in several examples described below.

EXAMPLE 6A

The reactor effluent stream from Example 6 with a $pH_2/pH_2O$ ratio of about 0.2 was mixed with 1.5% natural gas and used to anneal 1010 low carbon steel samples at 950° C. in the furnace. It was introduced into the heating zone of the furnace (location 76 in FIG. 1) through a porous diffuser similar to the one described in Example 5D.

The steel samples annealed in this example were bright without any signs of surface oxidation due to reducing nature of the atmosphere both in the heating and cooling zones of the furnace, as shown in Table 6. Examination of incoming material showed no decarburization while the steel sample annealed in this example produced marginal decarburization of approximately 0.0015 inches. The extent of decarburization was considerably lower than Examples 5A to 5F.

This example showed that low carbon steels can be bright annealed at 950° C. with marginal decarburization in 99.75% pure non-cryogenically produced nitrogen that has been deoxygenated with the use of an economical amount of hydrogen in an external catalytic reactor provided the deoxygenated stream is mixed with proper amount of natural gas and introduced into the heating zone of a continuous furnace.

EXAMPLE 6B

Example 6A was repeated using the identical procedure with the exception of using 2.0% natural gas. The steel samples annealed in this example were bright without any signs of surface oxidation, as shown in Table 6. Examination of incoming material showed no decarburization while the steel sample annealed in this example produced insignificant decarburization.

This example showed that low carbon steels can be bright annealed at 950° C. with insignificant decarburization in 99.75% pure non-cryogenically produced nitrogen that has been deoxygenated with the use of an economical amount of hydrogen in an external catalytic reactor provided the deoxygenated stream is mixed with proper amount of natural gas and introduced into the heating zone of a continuous furnace.

EXAMPLE 6C

Example 6A was repeated using the identical procedure with the exception of using 2.5% natural gas. The steel samples annealed in this example were bright without any signs of surface oxidation, as shown in Table 6. Examination of incoming material showed no decarburization while the steel sample annealed in this example produced insignificant decarburization.

This example showed that low carbon steels can be bright annealed at 950° C. with insignificant decarburization in 99.75% pure non-cryogenically produced nitrogen that has been deoxygenated with economical amount of hydrogen in an external catalytic reactor provided the deoxygenated stream is mixed with proper amount of natural gas and introduced into the heating zone of a continuous furnace.

EXAMPLE 6D

The reactor effluent stream from Example 6 with a $pH_2/pH_2O$ ratio of about 0.2 was mixed with 1.5% natural gas and used to anneal 1010 low carbon steel samples at 850° C. in the Watkins-Johnson furnace. It was introduced into the heating zone of the furnace (location 76 in FIG. 1) through a porous diffuser similar to the one described in Example 5D.

The steel samples annealed in this example were bright without any signs of surface oxidation due to reducing nature of the atmosphere both in the heating and cooling zones of the furnace, as shown in Table 6. Examination of incoming material showed no decarburization while the steel sample annealed in this example produced surface decarburization to a depth of approximately 0.0035 inches.

This example showed that low carbon steels can be bright annealed at 950° C. with some decarburization in 99.75% pure non-cryogenically produced nitrogen that has been deoxygenated with the use of an economical amount of hydrogen in an external catalytic reactor provided the deoxygenated stream is mixed with proper amount of natural gas and introduced into the heating zone of a continuous furnace.

EXAMPLE 6E

Example 6D was repeated using the identical procedure with the exception of using 2.0% natural gas. The steel samples annealed in this example were bright without any signs of surface oxidation, as shown in Table 6. Examination of incoming material showed no decarburization while the steel sample annealed in this example produced surface decarburization to a depth of approximately 0.0030 inches.

This example showed that low carbon steels can be bright annealed at 850° C. with some decarburization in 99.75% pure non-cryogenically produced nitrogen that has been deoxygenated with the use of an economical amount of hydrogen in an external catalytic reactor provided the deoxygenated stream is mixed with proper amount of natural gas and introduced into the heating zone of a continuous furnace.

EXAMPLE 6F

Example 6D was repeated using the identical procedure with the exception of using 2.5% natural gas. The steel samples annealed in this example were bright without any signs of surface oxidation, as shown in Table 6. Examination of incoming material showed no decarburization while the steel sample annealed in this example produced marginal surface decarburization to a depth of approximately 0.002 inches.

This example showed that low carbon steels can be bright annealed at 850° C. with marginal decarburization in 99.75% pure non-cryogenically produced nitrogen that has been deoxygenated with economical amount of hydrogen in an external catalytic reactor provided the deoxygenated stream is mixed with proper amount of natural gas and introduced into the heating zone of a continuous furnace.

Examples 6A to 6F showed that a non-cryogenically produced nitrogen can be used to bright anneal carbon steels with some or no decarburization using an economical amount of hydrogen and the integrated two-step process of the present invention.

TABLE 7

|  | Example 7A | Example 7B | Example 7C | Example 8A |
|---|---|---|---|---|
| Experiment No. | 12150-90-150 | 12150-91-151 | 12150-92-156 | 12150-92-154 |
| Heat Treating Temperature, °C. | 950 | 950 | 850 | 850 |
| Feed Gas Location | Heating Zone | Heating Zone | Heating Zone | Heating Zone |
| Feed Gas Device | Diffuser | Diffuser | Diffuser | Diffuser |
| Feed Gas Composition |  |  |  |  |
| Residual Oxygen, ppm | <2 | <2 | <2 | <2 |
| Hydrogen, % | 0.2 | 0.2 | 0.2 | 0.1 |
| Moisture, % | 1.0 | 1.0 | 1.0 | 0.5 |
| Amount of Propane Added, % | 0.3 | 0.4 | 0.3 | 0.3 |
| Heating Zone Atmosphere Composition |  |  |  |  |
| Oxygen, ppm | <2 | <2 | <3 | <3 |

TABLE 7-continued

|  | Example 7A | Example 7B | Example 7C | Example 8A |
| --- | --- | --- | --- | --- |
| Carbon Monoxide, % | 0.70 | 0.70 | 0.65 | 0.50 |
| Hydrogen, % | 1.60 | 1.60 | 1.50 | 1.10 |
| Dew Point, °C. | −51.5 | −51.5 | −32.0 | −51.2 |
| Cooling Zone Atmosphere Composition | | | | |
| Oxygen, ppm | <3 | <2 | <2 | <3 |
| Carbon Monoxide, % | 0.65 | 0.60 | 0.60 | 0.45 |
| Hydrogen, % | 1.55 | 1.40 | 1.35 | 1.00 |
| Dew Point, °C. | −26.7 | −27.5 | −24.1 | −39.8 |
| Quality of Heat Treated Samples | Uniform Bright | Uniform Bright | Uniform Bright | Uniform Bright |

Notes:
Amount of unreacted propane in the heating and cooling zones was not determined.
Negligible amount of carbon dioxide was detected in the heating and cooling zones.

EXAMPLE 7

A 350 SCFH of nitrogen stream containing 0.50% (5,000 ppm) oxygen was mixed with 1.2% hydrogen and deoxygenated by passing the gaseous feed mixture through a 3" diameter catalytic reactor at 4,800 1/h GHSV using palladium metal catalyst similar to the one described in Example 2A. The amount of hydrogen used was 1.2 times the stoichiometric amount required for completely converting oxygen to water. The reactor effluent stream contained less than 2 ppm residual oxygen and 0.2% unreacted hydrogen. This stream was mixed with propane and introduced into the heating zone of the Watkins-Johnson furnace to produce atmospheres suitable for bright, decarburized annealing and bright, decarburized-free annealing of carbon steels in several examples described below.

EXAMPLE 7A

The reactor effluent stream from Example 7 with a $pH_2/pH_2O$ ratio of about 0.2 was mixed with 0.3% propane and used to anneal 1010 low carbon steel samples at 950° C. in the furnace. It was introduced into the heating zone of the furnace (location 76 in FIG. 1) through a porous diffuser similar to the one described in Example 5D.

The steel samples annealed in this example were bright without any signs of surface oxidation due to reducing nature of the atmosphere both in the heating and cooling zones of the furnace, as shown in Table 7. Examination of incoming material showed no decarburization while the steel sample annealed in this example produced insignificant surface decarburization to a depth of approximately 0.0010 inch.

This example showed that low carbon steels can be bright annealed at 950° C. with insignificant decarburization in non-cryogenically produced nitrogen that has been deoxygenated with the use of an economical amount of hydrogen in an external catalytic reactor provided the deoxygenated stream is mixed with proper amount of propane and introduced into the heating zone of a continuous furnace through a diffuser.

EXAMPLE 7B

Example 7A was repeated using the identical procedure with the exception of using 0.4% propane. The steel samples annealed in this example were bright without any signs of surface oxidation, as shown in Table 7. Examination of incoming and annealed materials showed no decarburization.

This example showed that low carbon steels can be bright annealed at 950° C. with no decarburization in non-cryogenically produced nitrogen that has been deoxygenated with the use of an economical amount of hydrogen in an external catalytic reactor provided the deoxygenated stream is mixed with proper amount of propane and introduced into the heating zone of a continuous furnace through a diffuser.

EXAMPLE 7C

The reactor effluent stream from Example 7 with a $pH_2/pH_2O$ ratio of about 0.2 was mixed with 0.3% propane and used to anneal 1010 low carbon steel samples at 850° C. in the furnace. It was introduced into the heating zone of the furnace (location 76 in FIG. 1) through a porous diffuser similar to the one described in Example 5D.

The steel samples annealed in this example were bright without any signs of surface oxidation due to reducing nature of the atmosphere both in the heating and cooling zones of the furnace, as shown in Table 7. Examination of incoming material showed no decarburization while the steel sample annealed in this example produced insignificant surface decarburization to a depth of approximately 0.0035 inches.

This example showed that low carbon steels can be bright annealed at 850° C. with some decarburization in non-cryogenically produced nitrogen that has been deoxygenated with the use of an economical amount of hydrogen in an external catalytic reactor provided the deoxygenated stream is mixed with proper amount of propane and introduced into the heating zone of a continuous furnace through a diffuser.

EXAMPLE 8

A 350 SCFH of nitrogen stream containing 0.25% (2,500 ppm) oxygen was mixed with 0.6% hydrogen and deoxygenated by passing the gaseous feed mixture through a 3" diameter catalytic reactor at 4,800 1/h GHSV using palladium metal catalyst similar to the one described in Example 2A. The amount of hydrogen used was 1.2 times the stoichiometric amount required for completely converting oxygen water. The reactor effluent stream contained less than 2 ppm residual oxygen and 0.1% unreacted hydrogen. This stream was mixed with propane and introduced into the heating zone of the Watkins-Johnson furnace to produce atmospheres suitable for annealing carbon steels in the example described below.

EXAMPLE 8A

The reactor effluent stream from Example 8 with a $pH_2/pH_2O$ ratio of about 0.2 was mixed with 0.3% propane and used to anneal 1010 low carbon steel samples at 850° C. in the furnace. It was introduced into the heating zone of the furnace (location 76 in FIG. 1) through a porous diffuser similar to the one described in Example 5D.

The steel samples annealed in this example were bright without any signs of surface oxidation due to reducing nature of the atmosphere both in the heating and cooling zones of the furnace, as shown in Table 7. Examination of incoming and annealed materials showed no decarburization.

This example showed that low carbon steels can be bright annealed at 850° C. with no decarburization in 99.75% pure non-cryogenically produced nitrogen that has been deoxygenated with the use of an economical amount of hydrogen in an external catalytic reactor provided the deoxygenated stream is mixed with proper amount of propane and introduced into the heating zone of a continuous furnace through a diffuser.

Examples 7A to 7C and 8A showed that a non-cryogenically produced nitrogen can be used to bright anneal carbon steels with some or no decarburization using an economical amount of hydrogen and the integrated two-step process of the present invention.

powder containing 2.0% copper, 0.75% zinc stearate, 0.9% carbon and balance iron. They were delubed to remove zinc stearate and other lubricants prior to sintering in the furnace. The effluent stream from the catalytic reactor mixed with natural gas was introduced into the heating zone of the furnace (location 76 in FIG. 1) through a porous diffuser similar to the one described in Example 5D.

The powder metal parts sintered in this example were bright due to reducing nature of the atmosphere both in the heating and cooling zones of the furnace, as shown in Table 8. Cross-sectional analysis of a sintered part showed it to be dense with bulk density of approximately 6.8 g/cm which was very similar to the value noted with in a similar part sintered in pure nitrogen-hydrogen mixture. The bulk of the sintered part contained a carbon level between 0.6 to 0.7%, which was once again similar to the level noted in a similar part sintered in pure hydrogen-nitrogen mixture. The physi-

TABLE 8

|  | Example 9A | Example 9B | Example 9C |
| --- | --- | --- | --- |
| Experiment No. | 12160-23-5 | 12160-37-15 | 12160-38-16 |
| Heat Treating Temperature, °C. | 1,120 | 1,120 | 1,120 |
| Feed Gas Location | Heating Zone | Heating Zone | Heating Zone |
| Feed Gas Device | Diffuser | Diffuser | Diffuser |
| Feed Gas Composition |  |  |  |
| Residual Oxygen, ppm | <2 | <2 | <2 |
| Hydrogen, % | 0.2 | 0.2 | 0.2 |
| Moisture, % | 1.0 | 1.0 | 1.0 |
| Natural Gas (Methane) Added to Effluent Gas, % | 1.5 | 2.5 | 3.0 |
| Heating Zone Atmosphere Composition |  |  |  |
| Oxygen, ppm | <2 | <2 | <2 |
| Carbon Monoxide, % | 0.85 | 0.75 | 0.75 |
| Hydrogen, % | 2.40 | 2.20 | 2.20 |
| Methane, % | 0.60 | 1.70 | 2.20 |
| Dew Point, °C. | −57.4 | −57.4 | −57.9 |
| Cooling Zone Atmosphere Composition |  |  |  |
| Oxygen, ppm | <2 | <2 | <2 |
| Carbon Monoxide, % | 0.85 | 0.70 | 0.70 |
| Hydrogen, % | 2.40 | 2.10 | 2.10 |
| Methane, % | 0.55 | 1.75 | 2.30 |
| Dew Point, °C. | −30.7 | −32.1 | −31.3 |

Note:
Negligible amount of carbon dioxide was detected in the heating and cooling zones.

Several experiments were conducted to produce atmospheres suitable for sintering steel using an economical amount of hydrogen and the integrated two-step process of the present invention.

EXAMPLE 9

A 350 SCFH of nitrogen stream containing 0.5% (5,000 ppm) oxygen was mixed with 1.2% hydrogen and deoxygenated by passing the gaseous feed mixture through a 3" diameter catalytic reactor at 4,800 l/h GHSV using palladium metal catalyst similar to the one described in Example 2A. The amount of hydrogen used was 1.2 times the stoichiometric amount required for completely converting oxygen to water. The reactor effluent stream contained less than 2 ppm residual oxygen and 0.2% unreacted hydrogen. This stream was mixed with natural gas and introduced into the heating zone of the Watkins-Johnson furnace to produce atmospheres suitable for sintering steel in several examples described below.

EXAMPLE 9A

The reactor effluent stream from Example 9 with a $pH_2/pH_2O$ ratio of about 0.2 was mixed with 1.5% natural gas and used to sinter a number of steel parts at 1120° C. in the furnace. The parts were made of steel cal dimensions of the sintered part were also very similar to those noted with a similar part sintered in pure nitrogen-hydrogen mixture. The surface of the sintered part was decarburized to a depth of approximately 0.003 inches.

This example showed steel powder metal parts can be sintered at 1,120° C. with some decarburization in non-cryogenically produced nitrogen that has been deoxygenated with the use of an economical amount of hydrogen in an external catalytic reactor provided deoxygenated stream is mixed with natural gas and introduced into the heating zone of a continuous furnace.

EXAMPLE 9B

Example 9A was repeated using the identical procedure with the exception of using 2.5% natural gas. The powder metal parts sintered in this example were bright due to reducing nature of the atmosphere both in the heating and cooling zones of the furnace, as shown in Table 8. Cross-sectional analysis of a sintered part showed it to be dense with bulk density of approximately 6.8 g/cm³. The bulk of the sintered part contained a carbon level between 0.6 to 0.7%, which was similar to the level noted in a similar part sintered in pure hydrogen-nitrogen atmosphere. The physical dimensions of the sintered part were also very similar to those noted with a similar part sintered in pure nitrogen-hydrogen mixture. The surface of the sintered part showed insignificant or no decarburization. The surface hardness of the sintered part was similar to that observed with a part sintered in pure hydrogen-nitrogen atmosphere.

This example showed steel powder metal parts can be sintered at 1,120° C. with insignificant or no decarburization in non-cryogenically produced nitrogen that has been deoxygenated with the use of an economical amount of hydrogen in an external catalytic reactor provided the deoxygenated stream is mixed with proper amount of natural gas and introduced into the heating zone of a continuous furnace.

EXAMPLE 9C

Example 9A was repeated using the identical procedure with the exception of using 3.0% natural gas. The powder metal parts sintered in this example were bright due to reducing nature of the atmosphere both in the heating and cooling zones of the furnace, as shown in Table 8. Cross-sectional analysis of a sintered part showed it to be dense with bulk density of approximately 6.8 g/cm$^3$. The bulk of the sintered part contained a carbon level between 0.6 to 0.7%, which was similar to the level noted in a similar part sintered in pure hydrogen-nitrogen atmosphere. The physical dimensions of the sintered part were also very similar to those noted with a similar part sintered in pure nitrogen-hydrogen mixture. The surface of the sintered part showed insignificant or no decarburization. The surface hardness of the sintered part was similar to that observed with a part sintered in pure hydrogen-nitrogen atmosphere.

This example showed steel powder metal parts can be sintered at 1,120° C. with insignificant or no decarburization in non-cryogenically produced nitrogen that has been deoxygenated with the use of an economical amount of hydrogen in an external catalytic reactor provided the deoxygenated stream is mixed with proper amount of natural gas and introduced into the heating zone of a continuous furnace.

Examples 9A to 9C showed that parts made of steel powders can be sintered effectively without sacrificing material and surface properties in non-cryogenically produced nitrogen that has been deoxygenated with the use of an economical amount of hydrogen in an external catalytic reactor provided the deoxygenated stream is mixed with the right amount of a hydrocarbon gas and introduced into heating zone of a sintering furnace. This is a significant and unexpected finding.

We claim:

1. A method for generating a controlled atmosphere inside a continuous heat treating furnace for maintaining or affecting the surface characteristics of parts exposed to said atmosphere comprising the steps of:

mixing non-cryogenically produced nitrogen containing up to three percent by volume residual oxygen with hydrogen;

passing said mixture through a bed of a precious metal catalyst to form an effluent gas containing nitrogen, unreacted hydrogen and water vapor;

mixing said effluent with a predetermined amount of a hydrocarbon gas; and introducing said mixture of said effluent and hydrocarbon gas into the heating zone of said furnace in order to permit conversion in-situ of moisture in the furnace atmosphere to a mixture of carbon monoxide and hydrogen by reaction with said hydrocarbon gas via water gas shift reaction.

2. A method according to claim 1 wherein said hydrocarbon gas is selected from the group consisting of alkanes, alkenes and mixtures thereof.

3. A method according to claim 1 wherein said hydrocarbon gas is selected from the group consisting of methane, ethane, propane, butane, ethylene, propylene, butene and mixtures thereof.

4. A method according to claim 1 wherein non-cryogenically produced nitrogen is mixed with at least 1.05 times the stoichiometric amount of hydrogen required to convert residual oxygen to moisture.

5. A method according to claim 1 wherein said mixture of non-cryogenically produced nitrogen and hydrogen is passed through a catalytic reactor having a precious metal catalyst supported on alumina or a metallic or ceramic honeycomb, said mixture passing at an hourly flow rate of between 4,000 to 50,000 times the volume of the reactor.

6. A method according to claim 1 wherein said bed of precious metal catalyst is heated to a temperature at or about 20° C. for a period of time to permit the reaction of said oxygen in said nitrogen and said hydrogen to become self-initiating in nature.

7. A method according to claim 1 wherein the flow rate of hydrocarbon gas mixed with said effluent is adjusted so that the pH$_2$/pH$_2$O inside the furnace indicates the furnace atmosphere is reducing in nature.

8. A method according to claim 1 wherein said hydrogen is obtained from an ammonia generator.

9. A method according to claim 1 wherein said mixture of said effluent and hydrocarbon gas are introduced into said furnace by directing said mixture away from direct impingement on said part.

10. A method according to claim 1 wherein the temperature of the furnace and the amount of hydrocarbon gas are controlled to control surface decarburization of ferrous metal parts passing through said furnace.

11. A method according to claim 1 wherein said furnace is heated to a temperature at or about 700° C.

12. A method according to claim 1 wherein the said in-situ produced gaseous mixtures is used for bright annealing ferrous and non-ferrous parts, brazing parts, sintering metal and ceramic powders, and sealing glass to metals.

* * * * *